US008572138B2

(12) United States Patent
Sundar et al.

(10) Patent No.: US 8,572,138 B2
(45) Date of Patent: Oct. 29, 2013

(54) DISTRIBUTED COMPUTING SYSTEM HAVING AUTONOMIC DEPLOYMENT OF VIRTUAL MACHINE DISK IMAGES

(75) Inventors: Jagane Sundar, Saratoga, CA (US); Sanjay Radia, Fremont, CA (US); David A. Henseler, Maplewood, MN (US)

(73) Assignee: CA, Inc., Islandia, NY (US)

( * ) Notice: Subject to any disclaimer, the term of this patent is extended or adjusted under 35 U.S.C. 154(b) by 1339 days.

(21) Appl. No.: 11/694,483

(22) Filed: Mar. 30, 2007

(65) Prior Publication Data

US 2007/0233698 A1    Oct. 4, 2007

Related U.S. Application Data

(60) Provisional application No. 60/787,280, filed on Mar. 30, 2006.

(51) Int. Cl.
*G06F 12/00* (2006.01)
*G06F 17/30* (2006.01)

(52) U.S. Cl.
USPC ............................. 707/828; 707/831; 718/1

(58) Field of Classification Search
None
See application file for complete search history.

(56) References Cited

U.S. PATENT DOCUMENTS

| | | | |
|---|---|---|---|
| 6,256,637 B1 * | 7/2001 | Venkatesh et al. | 1/1 |
| 6,513,059 B1 * | 1/2003 | Gupta et al. | 709/202 |
| 6,775,829 B1 | 8/2004 | Kroening | |
| 6,865,737 B1 | 3/2005 | Lucas et al. | |
| 7,093,239 B1 * | 8/2006 | van der Made | 717/135 |
| 7,246,351 B2 * | 7/2007 | Bloch et al. | 717/175 |
| 2002/0129129 A1 * | 9/2002 | Bloch et al. | 709/220 |
| 2002/0156877 A1 | 10/2002 | Lu et al. | |
| 2003/0074360 A1 * | 4/2003 | Chen et al. | 707/100 |
| 2003/0078958 A1 * | 4/2003 | Pace et al. | 709/201 |
| 2003/0110173 A1 * | 6/2003 | Marsland | 707/10 |
| 2003/0126265 A1 | 7/2003 | Aziz et al. | |

(Continued)

FOREIGN PATENT DOCUMENTS

| | | |
|---|---|---|
| WO | WO/03/085526 A1 | 10/2003 |
| WO | WO/2006/081503 A1 | 8/2006 |

(Continued)

OTHER PUBLICATIONS

E.N. Herness et al., "WebSphere Application Server: A Foundation for on Demand Computing," IBM Systems Journal IBM, vol. 43, No. 2, pp. 213-237, XP-002383791, 2004.

(Continued)

*Primary Examiner* — Angelica Ruiz
(74) *Attorney, Agent, or Firm* — Baker Botts, L.L.P.

(57) ABSTRACT

One or more control nodes provide for the efficient and automated allocation and management of computing functions and resources within the distributed computing system. The distributed computing system includes a software image repository storing: (i) one or more image instances of a virtual machine manager that is executable on the application nodes, wherein when executed on the applications nodes, the image instances of the virtual machine manager provide one or more virtual machines, and (ii) one or more image instances of one or more software applications that are executable on the virtual machines. The distributed computing system also includes a control node that comprises an automation infrastructure to provide autonomic deployment of the image instances of the virtual machine manager on the application nodes and to provide autonomic deployment of the image instances of the software applications on the virtual machines.

26 Claims, 29 Drawing Sheets

(56) References Cited

U.S. PATENT DOCUMENTS

| | | | |
|---|---|---|---|
| 2003/0135509 A1* | 7/2003 | Davis et al. | 707/100 |
| 2003/0135658 A1* | 7/2003 | Haggar et al. | 709/312 |
| 2003/0140282 A1 | 7/2003 | Kaler et al. | |
| 2003/0177176 A1 | 9/2003 | Hirschfeld et al. | |
| 2003/0192035 A1* | 10/2003 | Duesterwald ald | 717/138 |
| 2004/0088694 A1 | 5/2004 | Ho | |
| 2004/0162741 A1 | 8/2004 | Flaxer et al. | |
| 2004/0181794 A1 | 9/2004 | Coleman et al. | |
| 2004/0187104 A1 | 9/2004 | Sardesai et al. | |
| 2004/0230948 A1* | 11/2004 | Talwar et al. | 717/114 |
| 2004/0260734 A1 | 12/2004 | Ren et al. | |
| 2005/0005200 A1 | 1/2005 | Matena et al. | |
| 2005/0039180 A1* | 2/2005 | Fultheim et al. | 718/1 |
| 2005/0138370 A1* | 6/2005 | Goud et al. | 713/164 |
| 2005/0193265 A1 | 9/2005 | Lin et al. | |
| 2006/0173856 A1 | 8/2006 | Jackson et al. | |
| 2006/0173857 A1 | 8/2006 | Jackson | |
| 2006/0173895 A1 | 8/2006 | Engquist et al. | |
| 2006/0173984 A1 | 8/2006 | Emeis et al. | |
| 2006/0173993 A1 | 8/2006 | Henseler et al. | |
| 2006/0173994 A1 | 8/2006 | Emeis et al. | |
| 2006/0174238 A1 | 8/2006 | Henseler et al. | |
| 2006/0259292 A1* | 11/2006 | Solomon et al. | 703/27 |
| 2007/0168919 A1* | 7/2007 | Henseler et al. | 717/101 |
| 2007/0169049 A1* | 7/2007 | Gingell et al. | 717/151 |

FOREIGN PATENT DOCUMENTS

| | | |
|---|---|---|
| WO | WO/2006/083727 A1 | 8/2006 |
| WO | WO/2006/083893 A1 | 8/2006 |
| WO | WO/2006/083894 A1 | 8/2006 |
| WO | WO/2006/083895 A1 | 8/2006 |
| WO | WO/2006/083901 A1 | 8/2006 |

OTHER PUBLICATIONS

B. Urgaonkar et al., "Resource Overbooking and Application Profiling in Shared Hosting Platforms," Proceedings of the 5$^{th}$ Symposium on Operating Systems Design and Implementation, 17 pgs., XP-002387427, 2002.

G. Lodi et al., "QoS-aware Clustering of Application Servers," Proceedings of the 1$^{st}$ IEEE Workshop on Quality of Service for Application Servers, In Conjunction With the 23$^{rd}$ International Symposium on Reliable Distributed Systems, 6 pages, XP-002383792, Oct. 17, 2004.

*Preinstalling Microsoft Windows XP by Using the OEM Preinstallation Kit, Part 1*, XP-002301441, Apr. 4, 2003, 24 pages.

R. Mark Koan et al., *It Takes a Village to Build an Image*, XP-002384269, 2003, pp. 200-207.

U.S. Appl. No. 11/607,819 entitled, "Automated Deployment and Configuration of Applications in an Autonomically Controlled Distributed Computing System", filed Dec. 1, 2006.

U.S. Appl. No. 11/607,820 entitled, "Automated Deployment and Configuration of Applications in an Autonomically Controlled Distributed Computing System", filed Dec. 1, 2006.

* cited by examiner

| APPLICATION (360) | APPLICATION NODES (362) | SERVICES (364) | NODE MONITORED VALUES (366) | SERVICE MONITORED ATTRIBUTES (368) | SERVICE LEVELS (370) | DEPLOYMENT CONSTRAINTS (372) |
|---|---|---|---|---|---|---|
| Name= DataDomain<br>adminIP= "172.31.64.201"<br>adminPort= "1100"<br>adminTier= "Web Admin"<br>clusterName= "PathCluster"<br>expectedStartupDelay=120<br>loadDelay=120<br>maxNodes=2<br>minNodes=1 | | name="AI Design-time" path="/lib/ai-designtime.ear" | | | | |
| | | name="System EJBs" path="/lib/ejbs.ear" | | | | |
| | IP= 172.31.64.201<br>Name= managedServer_0 | name="Worklist Worker User Interface" path="/lib/worklist/worklist.ear" | name= Load5Average | name= PendRequests | attribute= "BusyThread-Percentage"<br>expression= "(ExecuteThreadTotalCount-ExecuteThreadIdleCount)*100/ ExecuteThreadTotal Count"<br>frequency="15"<br>maxThreshold="20.0"<br>minThreshold="5.0"<br>period="30" | attribute= "LoadAverage"<br>expression= "Load5Average"<br>frequency="15"<br>maxThreshold="4"<br>minThreshold="-1"<br>period="15" |
| | IP= 172.31.64.202<br>Name= managedServer_1 | name="DBMS_ADK" path="/lib/DBMS_ADK.ear" | name= PercentFree-Memory | name= ExecuteThread-IdleCount | attribute= "PendingRequests"<br>expression= "PendingRequests"<br>frequency="15"<br>maxThreshold="20"<br>minThreshold="5"<br>period="30" | attribute= "FreeMemory"<br>expression= "PercentMemoryFree*100"<br>frequency="15"<br>maxThreshold="-1"<br>minThreshold="1"<br>period="60" |
| | | name="App" path="/user_projects/domains/data.ear" | | name= ExecuteThread-TotalCount | | |
| name= Portal-Domain<br>...... | | | | | | |

ND Also from 'he: Wednesday, 27% May 2015 - # DISTRIBUTED COMPUTING SYSTEM HAVING AUTONOMIC DEPLOYMENT OF VIRTUAL MACHINE DISK IMAGES This application claims the benefit of U.S. provisional Application Ser. No. 60/787,280, filed Mar. 30, 2006, the entire content of which is incorporated herein by reference.

TECHNICAL FIELD

The invention relates to computing environments and, more specifically, to distributed computing systems.

BACKGROUND

Distributed computing systems are increasingly being utilized to support business as well as technical applications. Typically, distributed computing systems are constructed from a collection of computing nodes that combine to provide a set of processing services to implement the distributed computing applications. Each of the computing nodes in the distributed computing system is typically a separate, independent computing device interconnected with each of the other computing nodes via a communications medium, e.g., a network.

One challenge with distributed computing systems is the organization, deployment and administration of such a system within an enterprise environment. For example, it is often difficult to manage the allocation and deployment of enterprise computing functions within the distributed computing system. An enterprise, for example, often includes several business groups, and each group may have competing and variable computing requirements.

SUMMARY

In general, the invention is directed to a distributed computing system that conforms to a multi-level, hierarchical organizational model. One or more control nodes provide for the efficient and automated allocation and management of computing functions and resources within the distributed computing system in accordance with the organization model.

As described herein, the model includes four distinct levels: fabric, domains, tiers and nodes that provide for the logical abstraction and containment of the physical components as well as system and service application software of the enterprise. A user, such as a system administrator, interacts with the control nodes to logically define the hierarchical organization of the distributed computing system. The control nodes are responsible for all levels of management in accordance with the model, including fabric management, domain creation, tier creation and node allocation and deployment.

In one embodiment, a distributed computing system comprises a plurality of application nodes interconnected via a communications network and a control node. The control node comprises a set of one or more applications to be executed on the application nodes, an application matrix that includes parameters for controlling the deployment of the applications within the distributed computing system, and an automation unit having one or more rule engines that provide autonomic control of the application nodes and the applications in accordance with a set of one or more rules and the application matrix.

In another embodiment, a method comprises generating an application matrix that specifies data for controlling the deployment of a set of applications within a distributed computing system, and performing operations to provide autonomic control over the deployment of the applications within the distributed computing system in accordance with parameters of the application matrix.

In another embodiment, a computer-readable medium comprises instructions. The instructions cause the processor to generate an application matrix that specifies data for controlling the deployment of a set of applications within a distributed computing system, and perform operations to provide autonomic control over the deployment of the applications within the distributed computing system in accordance with parameters of the application matrix.

In another embodiment, a distributed computing system comprises a plurality of application nodes interconnected via a communications network. In addition, the distributed computing system includes a software image repository storing: (i) one or more image instances of a virtual machine manager that is executable on the application nodes, wherein when executed on the applications nodes, the image instances of the virtual machine manager provide one or more virtual machines, and (ii) one or more image instances of one or more software applications that are executable on the virtual machines. The distributed computing system also includes a control node that comprises an automation infrastructure to provide autonomic deployment of the image instances of the virtual machine manager on the application nodes and to provide autonomic deployment of the image instances of the software applications on the virtual machines.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 22 is a flowchart illustrating an exemplary mode of initiating a control node utilizing an application matrix.

FIG. 29 is a screen image illustrating an exemplary node control interface for the embodiment described in FIGS. 24 through 27.

DETAILED DESCRIPTION

Figure 1:
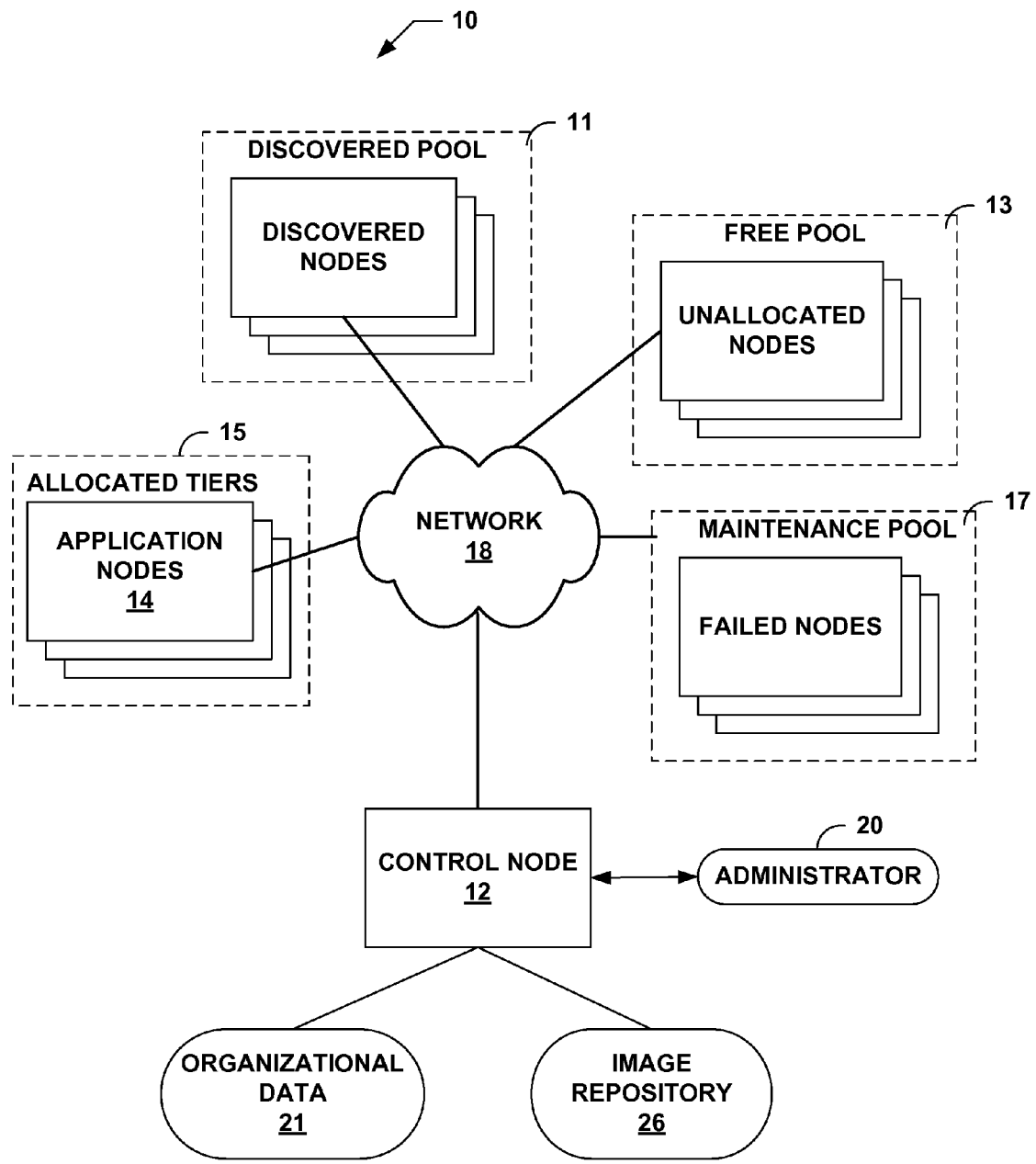
FIG. 1 is a block diagram illustrating a distributed computing system constructed from a collection of computing nodes.

FIG. 1 is a block diagram illustrating a distributed computing system 10 constructed from a collection of computing nodes. Distributed computing system 10 may be viewed as a collection of computing nodes operating in cooperation with each other to provide distributed processing.

In the illustrated example, the collection of computing nodes forming distributed computing system 10 are logically grouped within a discovered pool 11, a free pool 13, an allocated tiers 15 and a maintenance pool 17. In addition, distributed computing system 10 includes at least one control node 12.

Within distributed computing system 10, a computing node refers to the physical computing device. The number of computing nodes needed within distributed computing system 10 is dependent on the processing requirements. For example, distributed computing system 10 may include 8 to 512 computing nodes or more. Each computing node includes one or more programmable processors for executing software instructions stored on one or more computer-readable media.

Discovered pool 11 includes a set of discovered nodes that have been automatically "discovered" within distributed computing system 10 by control node 12. For example, control node 12 may monitor dynamic host communication protocol (DHCP) leases to discover the connection of a node to network 18. Once detected, control node 12 automatically inventories the attributes for the discovered node and reassigns the discovered node to free pool 13. The node attributes identified during the inventory process may include a CPU count, a CPU speed, an amount of memory (e.g., RAM), local disk characteristics or other computing resources. Control node 12 may also receive input identifying node attributes not detectable via the automatic inventory, such as whether the node includes I/O, such as HBA. Further details with respect to the automated discovery and inventory processes are described in U.S. patent application Ser. No. 11/070,851, entitled "AUTOMATED DISCOVERY AND INVENTORY OF NODES WITHIN AN AUTONOMIC DISTRIBUTED COMPUTING SYSTEM," filed Mar. 2, 2005, the entire content of which is hereby incorporated by reference.

Free pool 13 includes a set of unallocated nodes that are available for use within distributed computing system 10. Control node 12 may dynamically reallocate an unallocated node from free pool 13 to allocated tiers 15 as an application node 14. For example, control node 12 may use unallocated nodes from free pool 13 to replace a failed application node 14 or to add an application node to allocated tiers 15 to increase processing capacity of distributed computing system 10.

In general, allocated tiers 15 include one or more tiers of application nodes 14 that are currently providing a computing environment for execution of user software applications. In addition, although not illustrated separately, application nodes 14 may include one or more input/output (I/O) nodes. Application nodes 14 typically have more substantial I/O capabilities than control node 12, and are typically configured with more computing resources (e.g., processors and memory). Maintenance pool 17 includes a set of nodes that either could not be inventoried or that failed and have been taken out of service from allocated tiers 15.

Control node 12 provides the system support functions for managing distributed computing system 10. More specifically, control node 12 manages the roles of each computing node within distributed computing system 10 and the execution of software applications within the distributed computing system. In general, distributed computing system 10 includes at least one control node 12, but may utilize additional control nodes to assist with the management functions.

Other control nodes 12 (not shown in FIG. 1) are optional and may be associated with a different subset of the computing nodes within distributed computing system 10. Moreover, control node 12 may be replicated to provide primary and backup administration functions, thereby allowing for graceful handling a failover in the event control node 12 fails.

Network 18 provides a communications interconnect for control node 12 and application nodes 14, as well as discovered nodes, unallocated nodes and failed nodes. Communications network 18 permits internode communications among the computing nodes as the nodes perform interrelated operations and functions. Communications network 18 may comprise, for example, direct connections between one or more of the computing nodes, one or more customer networks maintained by an enterprise, local area networks (LANs), wide area networks (WANs) or a combination thereof. Communications network 18 may include a number of switches, routers, firewalls, load balancers, and the like.

In one embodiment, each of the computing nodes within distributed computing system 10 executes a common general-purpose operating system. One example of a general-purpose operating system is the Windows™ operating system provided by Microsoft Corporation. In some embodiments, the general-purpose operating system such as the Linux kernel may be used.

In the example of FIG. 1, control node 12 is responsible for software image management. The term "software image" refers to a complete set of software loaded on an individual computing node to provide an execution environment for one or more applications. The software image including the operating system and all boot code, middleware files, and may include application files. As described below embodiments of the invention provide application-level autonomic control over the deployment, execution and monitoring of applications onto software images associated with application nodes 14.

System administrator 20 may interact with control node 12 and identify the particular types of software images to be associated with application nodes 14. Alternatively, administration software executing on control node 12 may automatically identify the appropriate software images to be deployed to application nodes 14 based on the input received from system administrator 20. For example, control node 12 may determine the type of software image to load onto an application node 14 based on the functions assigned to the node by system administrator 20. Application nodes 14 may be divided into a number of groups based on their assigned functionality. As one example, application nodes 14 may be divided into a first group to provide web server functions, a second group to provide business application functions and a third group to provide database functions. The application nodes 14 of each group may be associated with different software images.

Control node 12 provides for the efficient allocation and management of the various software images within distributed computing system 10. In some embodiments, control node 12 generates a "golden image" for each type of software image that may be deployed on one or more of application nodes 14. As described herein, the term "golden image" refers to a reference copy of a complete software stack for providing an execution environment for applications.

System administrator 20 may create a golden image by installing an operating system, middleware and software applications on a computing node and then making a complete copy of the installed software. In this manner, a golden image may be viewed as a "master copy" of the software image for a particular computing function. Control node 12 maintains a software image repository 26 that stores the golden images associated with distributed computing system 10.

Control node 12 may create a copy of a golden image, referred to as an "image instance," for each possible image instance that may be deployed within distributed computing system 10 for a similar computing function. In other words, control node 12 pre-generates a set of K image instances for a golden image, where K represents the maximum number of image instances for which distributed computing system 10 is configured for the particular type of computing function. For a given computing function, control node 12 may create the complete set of image instance even if not all of the image instances will be initially deployed. Control node 12 creates different sets of image instances for different computing functions, and each set may have a different number of image instances depending on the maximum number of image instances that may be deployed for each set. Control node 12 stores the image instances within software image repository 26. Each image instance represents a collection of bits that may be deployed on an application node.

Further details of software image management are described in co-pending U.S. patent application Ser. No. 11/046,133, entitled "MANAGEMENT OF SOFTWARE IMAGES FOR COMPUTING NODES OF A DISTRIBUTED COMPUTING SYSTEM," filed Jan. 28, 2005 and co-pending U.S. patent application Ser. No. 11/046,152, entitled "UPDATING SOFTWARE IMAGES ASSOCIATED WITH A DISTRIBUTED COMPUTING SYSTEM," filed Jan. 28, 2005, each of which is incorporated herein by reference in its entirety.

In general, distributed computing system 10 conforms to a multi-level, hierarchical organizational model that includes four distinct levels: fabric, domains, tiers and nodes. Control node 12 is responsible for all levels of management, including fabric management, domain creation, tier creation and node allocation and deployment.

As used herein, the "fabric" level generally refers to the logical constructs that allow for definition, deployment, partitioning and management of distinct enterprise applications. In other words, fabric refers to the integrated set of hardware, system software and application software that can be "knitted" together to form a complete enterprise system. In general, the fabric level consists of two elements: fabric components or fabric payload. Control node 12 provides fabric management and fabric services as described herein.

In contrast, a "domain" is a logical abstraction for containment and management within the fabric. The domain provides a logical unit of fabric allocation that enables the fabric to be partitioned amongst multiple uses, e.g. different business services.

Domains are comprised of tiers, such as a 4-tier application model (web server, application server, business logic, persistence layer) or a single tier monolithic application. Fabric domains contain the free pool of devices available for assignment to tiers.

A tier is a logically associated group of fabric components within a domain that share a set of attributes: usage, availability model or business service mission. Tiers are used to define structure within a domain e.g. N-tier application, and each tier represents a different computing function. A user, such as administrator 20, typically defines the tier structure within a domain. The hierarchical architecture may provide a high degree of flexibility in mapping customer applications to logical models which run within the fabric environment. The tier is one construct in this modeling process and is the logical container of application resources.

The lowest level, the node level, includes the physical components of the fabric. This includes computing nodes that, as described above, provide operating environments for system applications and enterprise software applications. In addition, the node level may include network devices (e.g., Ethernet switches, load balancers and firewalls) used in creating the infrastructure of network 18. The node level may further include network storage nodes that are network connected to the fabric.

System administrator 20 accesses administration software executing on control node 12 to logically define the hierarchical organization of distributed computing system 10. For example, system administrator 20 may provide organizational data 21 to develop a model for the enterprise and logically define the enterprise fabric. System administrator 20 may, for instance, develop a model for the enterprise that includes a number of domains, tiers, and node slots hierarchically arranged within a single enterprise fabric.

More specifically, system administrator 20 defines one or more domains that each correspond to a single enterprise application or service, such as a customer relation management (CRM) service. System administrator 20 further defines one or more tiers within each domain that represent the functional subcomponents of applications and services provided by the domain. As an example, system administrator 20 may define a storefront domain within the enterprise fabric that includes a web tier, an application tier and a database tier. In this manner, distributed computing system 10 may be configured to automatically provide web server functions, business application functions and database functions.

For each of the tiers, control node 12 creates a number of "node slots" equal to the maximum number of application nodes 14 that may be deployed. In general, each node slot represents a data set that describes specific information for a corresponding node, such as software resources for a physical node that is assigned to the node slot. The node slots may, for instance, identify a particular software image instance associated with an application node 14 as well as a network address associated with that particular image instance.

In this manner, each of the tiers include one or more node slots that reference particular software image instances to boot on the application nodes 14 to which each software image instance is assigned. The application nodes 14 to which control node 12 assigns the image instances temporarily inherit the network address assigned to the image instance for as long as the image instance is deployed on that particular application node. If for some reason the image instance is moved to a different application node 14, control node 12A moves the network address to that new application node.

System administrator 20 may further define specific node requirements for each tier of the fabric. For example, the node requirements specified by system administrator 20 may include a central processing unit (CPU) count, a CPU speed, an amount of memory (e.g., RAM), local disk characteristics and other hardware characteristics that may be detected on the individual computing nodes. System administrator 20 may also specify user-defined hardware attributes of the computing nodes, such as whether I/O (like HBA) is required. The user-defined hardware attributes are typically not capable of detection during an automatic inventory. In this manner, system administrator 20 creates a list of attributes that the tier requires of its candidate computing nodes. In addition, particular node requirements may be defined for software image instances.

In addition to the node requirements described above, system administrator 20 may further define policies that are used when re-provisioning computing nodes within the fabric. System administrator 20 may define policies regarding tier characteristics, such as a minimum number of nodes a tier requires, an indication of whether or not a failed node is dynamically replaced by a node from free pool 13, a priority for each tier relative to other tiers, an indication of whether or not a tier allows nodes to be re-provisioned to other tiers to satisfy processing requirements by other tiers of a higher priority or other policies. Control node 12 uses the policy information input by system administrator 20 to re-provision computing nodes to meet tier processing capacity demands.

After receiving input from system administrator 20 defining the architecture and policy of the enterprise fabric, control node 12 identifies unallocated nodes within free pool 13 that satisfy required node attributes. Control node 12 automatically assigns unallocated nodes from free pool 13 to respective tier node slots of a tier. As will be described in detail herein, in one embodiment, control node 12 may assign computing nodes to the tiers in a "best fit" fashion. Particularly, control node 12 assigns computing nodes to the tier whose node attributes most closely match the node requirements of the tier as defined by administrator 20. The assignment of the computing nodes may occur on a tier-by-tier basis beginning with a tier with the highest priority and ending with a tier with the lowest priority. Alternatively, or in addition, assignment of computing nodes may be based on dependencies defined between tiers.

As will be described in detail below, control node 12 may automatically add unallocated nodes from free pool 13 to a tier when more processing capacity is needed within the tier, remove nodes from a tier to the free pool when the tier has excess capacity, transfer nodes from tier to tier to meet processing demands, or replace failed nodes with nodes from the free pool. Thus, computing resources, i.e., computing nodes, may be automatically shared between tiers and domains within the fabric based on user-defined policies to dynamically address high-processing demands, failures and other events.

Distributed computing system 10 may provide one or more advantages. For example, distributed computing system 10 may deliver application services in a manner that is independent of the computational infrastructure which generates the application services. For example, the computation infrastructure that provides an application service to a user of distributed computing system 10 may be irrelevant to the user, so long as distributed computing system provides the application service. Distributed computing system 10 may deliver application services in a manner that is independent of the computational infrastructure by utilizing an infrastructure management facility (IMF) that may guarantee application service delivery using "service level automation."

This concept is itself based upon two concepts: The Service Delivery Model and Service Level Automation.

1. Service Delivery Model: The concept of computing as a service is based upon the ability of the consumer to be guaranteed availability of the quantity and quality of an application service required at the time and location necessary, independent of the type of service provided (e.g. audio, video, application programs, etc). This may be achieved if the application services are provided in a manner that is independent of the location and condition of the physical and logical infrastructure which generates the application service, limited only by total capability and capacity available. This disclosure may refer to this concept as the "Service Delivery Model."

Physical and logical infrastructure facilities that provide an application service may comprise a "computing infrastructure." A "computing infrastructure" may include computing, storage and communication hardware and related software infrastructure; the application software and application containers; and other enabling facilities and services that are part of the environment necessary to generate and deliver application services.

2. Service Level Automation: In order to implement the service delivery model, the IMF may provide service level automation. The IMF may implement the service delivery model for single and/or multiple application service flows. For example, the IMF may automatically and dynamically adjust application service levels of these application service flows based on a policy automation facility. The policy automation facility may automate delivery of application service based upon dynamically extensible policies. These dynamically extensible policies may include but are not limited to: customer, location, priority, duration, date and time of day, service type, business demands and conditions, quantity and quality of the application service. The policy automation facility may also enable independent control of the application service by a service provider and by a consumer. Furthermore, the policy automation facility may allow the consumer provide the application service or a service based on the application service to another consumer. In addition, the IMF may measure both efficiency and cost as reflected in the behavior of the product. For example, the IMF may provide the ability to make decisions that account for the best uses of the resources on a dynamic basis in order to choose between functionally equivalent alternatives that make the best usage of the economics of the infrastructure at the time. This disclosure may refer to this concept as "Service Level Automation" (SLA).

Service-level automation may enable the separation of some or all aspects of the implementation of the computing infrastructure from the delivery of application services. Separating the implementation of the computing infrastructure from the delivery of application services may allow a consumer of the application services to decrease risk and cost while increasing business agility. Implementations of service-level automation may be based upon a new abstraction which operates independent of existing software categories (e.g. applications, middleware, data base, operating systems and system management) which for the purposes of this disclosure shall be referred to as "Metaware."

The IMF may comprise Metaware that regulates the delivery of application services through service-level automation. The IMF may use service-level automation to regulate the delivery of application services in a manner that is independent of the computing infrastructure that provides the application services. Because application services are the result of applications running within distributed computing system 10, the IMF may automate application service levels and may make independent of all aspects of the computing infrastructure within the limits of the capability and capacity available for delivery to the consumer. Service-level automation may provide extensible, dynamic policy-driven control of service delivery for both service providers and service consumers. The IMF may include the following six functional design capabilities:

1. Application Service Independence: The basic concept which enables the IMF to deliver application services may be the ability of the IMF to dynamically manage service-level automation in a manner that is independent of the computing infrastructure. A key element of this is that application services themselves are independent and unmodified. The IMF may be able to accomplish this by abstracting the physical and logical computing infrastructure away from the quantity and quality of application services generated by the computing infrastructure.

2. Scale Independence: The incremental overhead of the IMF required by any server included in distributed computing system 10 may be independent of the number of nodes in distributed computing system 10.

3. Container Capacity Metering: Distributed computing system 10 may achieve application service independence by dynamically metering higher-level software facilities of the computing infrastructure. The higher-level software facilities may generate the application services, service flow and flux. This disclosure may refer to these facilities as "container services." Examples of container services may include, but are not limited to, virtual machine managers, operating systems, and web application servers. Furthermore, some container services may contain other container services that the IMF manages. The system may conceptualize the application service as being independent of the type of computing infrastructure (e.g., middleware and hardware nodes) that generate these services.

4. Policy Automation: The IMF may deliver the required service-level automation through its extensible policy management facility. The policy management facility may dynamically adjust application service levels in order to implement user-defined policy. The ability to adjust application service levels may be limited only by the capacity and capability of the available computing infrastructure. The policy management facility may be capable of providing guaranteed service levels for single and/or multiple application service flows which the IMF automatically and dynamically adjust based on user-defined and extensible policies in response to changes in the environment. Examples of policies may include, but are not limited to: customer, location, service type, cost and/or pricing, quantity and quality of service, priority, duration, date and time of day, business demands and conditions, and other policies. The policy management facility may also allow the service provider to manage delivery and meter the capacity that the service provider delivers to individual customers. The policy management facility may allow the service provider to manage delivery and meter capacity independent of the ability of the customer to set and manage their own policies of how their capacity is utilized. This may be effectively done by leveraging application service independence.

5. Dynamic Provisioning: The IMF described herein may support the ability to dynamically provision at boot and run time all software in order to support installation, capacity management, service levels and other policies, and software upgrades. Offering a computing infrastructure architecture that is application service independent may create flexibility in deployment of a single instance of a service.

6. Data Capture Capability: The IMF described herein may acquire the data necessary to enable the service provider to implement metering and auditing facilities necessary to control, audit, bill and account for services provided in complete detail. The customer may also use the ability to capture this data as a means to educate the IMF about the performance characteristics of combinations of resources in order to allow the IMF to improve the quality of its scheduling decisions over time. Improvement of the quality of scheduling decisions may enhance the ability of the IMF to provide the requisite services with high efficiency.

The described system may allow customers to conveniently acquire the guaranteed quantity and quality of application services required at competitive market-driven rates with the ability to directly control the SLA capability of the IMF in order to maximize their operations efficiency and effectiveness without having to tradeoff operation risk, cost and business agility. Potential advantages may include, but are not limited to:

1. Efficiency and Effectiveness: The customer may not need to manage the technology, and can focus on the automation of the application service to improve their efficiency and effectiveness without having to tradeoff operation risk, cost and business agility which the IMF may enable through the service-level automation capability of the IMF.

2. Capabilities & Convenience: By leveraging the Internet as a generic, global delivery facility and separating the computing infrastructure from the application service delivery, the IMF may simplify the consumer's life in several ways:

i. Complexity: The IMF may eliminate the complexity of purchasing, installing, configuring, managing and administering the computing infrastructure.
ii. Access: The IMF may provide ubiquitous access to a full range of computing services wherever and whenever desired from any client device capable of accessing the Internet.
iii. Service Provider Independence: Consumers may be free to change providers by simply transferring their software images to a new service provider.
iv. Service Management: Service management may enable a consumer to provide services to customers of the consumer. For example, a corporation may be able to regulate and bill their individual business units for the capacity consumed.

3. Cost: By logically abstracting the application services from the computing infrastructure, the IMF may enable a competitive service provider industry that includes:
i. Capacity Utilization: A service provider using the IMF may be able to charge customers for capacity actually utilized by the customers. Presently, customers typically pay for the maximum capacity they would need at peak load.
ii. Choice of Suppliers: As the basic computing infrastructure facilities may be generic, the customer may have a choice of suppliers without the level of lock-in current vendors may enjoy. This may be enabled through the image and policy management implementation of the IMF. The image and policy management implementation of the IMF may allow portability across service providers through by enabling the customer to simply transfer the files to the new provider and initiating it with the IMF Metaware. The ability to easily migrate from a first service provider to a second service provider may drive the pricing competition. In this way, the ability of the IMF to provide application services independent of the computing infrastructure may enable customers to choose a service provider more effectively.
iii. Capital Expense Leverage: The customer may not need to own the capital equipment or software. Rather the service provider may be motivated to use the most cost effective components and amortize costs of these components across a customer base of the service provider. As a result, the cost to the consumer may be lower.
iv. Operations Expense Leverage: As the IMF automates most of the information technology operations functions, these costs may drop dramatically.

The IMF may enable the implementation of a service delivery model based on service-level automation by service providers:

1. A service provider may use the IMF to implement a service delivery model for application services independent of the computing infrastructure or of the service types provided. This capability may enable the service provider to deliver service-level automation on a global basis utilizing generic computing infrastructure for all types of digital services. Such digital service may include traditional applications and service flow processing, digital audio and digital video services independently to any consumer type (e.g. individual, organization or corporation) as long as the consumer has access to sufficient capacity of broadband communications for the services levels require, and other types of digital services. This capability of the IMF may also allow a consumer of an application service to, in turn, be a service provider as well.

2. The IMF described herein may enable a service provider to meter application services that distributed computing system 10 delivers. For example, the service provider may meter application services based on the capacity of computing infrastructure consumed by customer. The service provider may meter application services in order to control, audit, bill and account for the application services provided to individual consumers of the application services. This capability may represent a uniform model of service-level automation that is independent of the capacity of computing infrastructure for some or all types of application services. As a result, a pricing model of a service provider may reflect the goal of utility computing by enabling the service provider to bill based upon a combination of application service delivery parameters. These application service delivery parameters may include, but not limited to: customer, type of service, duration, date and/or time of day, location, point of delivery, quantity and quality of service and excess or reserved capacity, and other application service delivery parameters.

3. The IMF may also enable the service provider to leverage the economics of the service delivery model in several ways:
i. Utilization: By managing the computing infrastructure with the IMF, a service provider may be able to maintain much higher average utilization levels of the computing infrastructure. The maintenance of higher average utilization levels may dramatically reduce the amount of hardware purchased, software licensed and operations expenses.
ii. Global Service Demand Levels: Demand for an application service by an organization may vary by local time of day. By leveraging the global reach of the Internet, a service provider may be able to effectively manage the utilization of the computing infrastructure necessary to meet demand for the application service on a global "follow the sun" basis.
iii. Service Digitization: As more services become digital, service providers may deliver these services using a generic computing infrastructure architecture.
iv. Value-Added Services: A service provider may be free to provide value-added services beyond basic application services. A few examples of value-added services may include: a bundle of personal computer services that includes applications, storage, security, administration and related services; software as a service; compliance verification and certification, and other types of value-added services.
v. Hardware Commoditization: Hardware commoditization may enable a service provider to implement a computing infrastructure using generic low cost servers, storage facilities, and network switches. These hardware elements are undergoing dramatic commoditization which may allows for much lower capital expenses then in the past. This commoditization may continue for many years to come making capital expenses a much smaller part of the fixed costs for the service provider.
vi. Automation of Operations: One of the primary economic values of the IMF is that IMF may automate most of the runtime operations costs of the computing infrastructure. Operations expenses may constitute the majority of the costs of today. Because the IMF automates the runtime operations, the IMF may reduce runtime operations costs. Thus by leveraging the ability of the IMF to dramatically reduce the capital and operations expenses, the service provider may be able to implement an service delivery model that may justify the consumers switching cost.

vii. Software Commoditization: Software pricing is being commoditized based upon several factors which may continue to accelerate. These factors may include:
   1. Service-Oriented Architecture: Software systems that utilize a service-oriented architecture may accelerate innovation, allow for incremental independent innovation, eliminate down stream lock in by software vendors, and may make it possible to use commodity servers to run applications that previously required large expensive servers. Service-oriented architecture may also reduce complex applications to their most fundamental independently divisible functional services which will be the basis for the complete commoditization of software further leveraging the open source movement.
   2. Open Source Software: The open source software paradigm may serve as an accelerator for the commoditization of many types of software by both compromising the pricing power of software and serving as a reusable model of software services which may further compromise the value of horizontal software services.
   3. Good Enough: Application services are becoming more and more generic, thus accelerating their commoditization further in combination with service-oriented architectures and Open Source.

Figure 2:
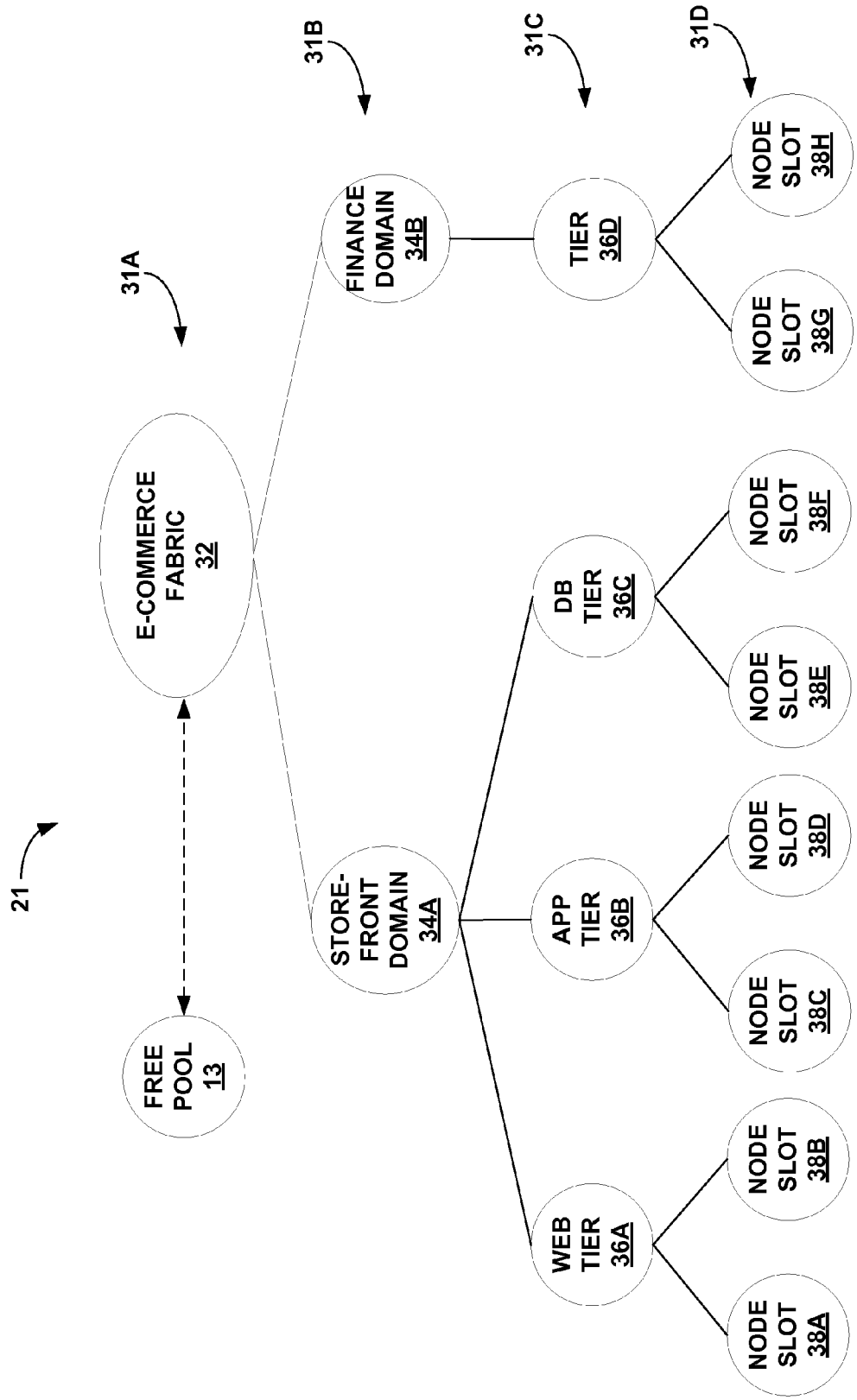
FIG. 2 is a schematic diagram illustrating an example of a model of an enterprise that logically defines an enterprise fabric.

FIG. 2 is a schematic diagram illustrating an example embodiment of organizational data 21 that defines a model logically representing an enterprise fabric in accordance with the invention. In the example illustrated in FIG. 2, control node 12 (FIG. 1) maintains organizational data 21 to define a simple e-commerce fabric 32.

In this example, e-commerce fabric 32 includes a storefront domain 34A and a financial planning domain 34B. Storefront domain 34A corresponds to the enterprise storefront domain and allows customers to find and purchase products over a network, such as the Internet. Financial planning domain 34B allows one or more employees to perform financial planning tasks for the enterprise.

Tier level 31C includes one or more tiers within each domain that represent the functional subcomponents of applications and services provided by the domain. For example, storefront domain 34A includes a web server tier (labeled "web tier") 36A, a business application tier (labeled "app tier") 36B, and a database tier (labeled "DB tier") 36C. Web server tier 36A, business application tier 36B and database tier 36C interact with one another to present a customer with an online storefront application and services. For example, the customer may interact with web server tier 36A via a web browser. When the customer searches for a product, web server tier 36A may interacts with business application tier 36B, which may in turn access a database tier 36C. Similarly, financial planning domain 34B includes a financial planning tier 36D that provides subcomponents of applications and services of the financial planning domain 34B. Thus, in this example, a domain may include a single tier.

Tier level 31D includes one or more logical node slots 38A-38H ("node slots 38") within each of the tiers. Each of node slots 38 include node specific information, such as software resources for an application node 14 that is assigned to a respective one of the node slots 38. Node slots 38 may, for instance, identify particular software image instances within image repository 26 and map the identified software image instances to respective application nodes 14. As an example, node slots 38A and 38B belonging to web server tier 36A may reference particular software image instances used to boot two application nodes 14 to provide web server functions. Similarly, the other node slots 38 may reference software image instances to provide business application functions, database functions, or financial application functions depending upon the tier to which the node slots are logically associated.

Although in the example of FIG. 2, there are two node slots 38 corresponding to each tier, the tiers may include any number of node slots depending on the processing capacity needed on the tier. Furthermore, not all of node slots 38 may be currently assigned to an application node 14. For example, node slot 28B may be associated with an inactive software image instance and, when needed, may be assigned to an application node 14 for deployment of the software image instance.

In this example, organizational data 21 associates free node pool 13 with the highest-level of the model, i.e., e-commerce fabric 32. As described above, control node 12 may automatically assign unallocated nodes from free node pool 13 to at least a portion of tier node slots 38 of tiers 36 as needed using the "best fit" algorithm described above or another algorithm. Additionally, control node 12 may also add nodes from free pool 13 to a tier when more processing capacity is needed within the tier, remove nodes from a tier to free pool 13 when a tier has excess capacity, transfer nodes from tier to tier to meet processing demands, and replace failed nodes with nodes from the free tier.

Although not illustrated, the model for the enterprise fabric may include multiple free node pools. For example, the model may associate free node pools with individual domains at the domain level or with individual tier levels. In this manner, administrator 20 may define policies for the model such that unallocated computing nodes of free node pools associated with domains or tiers may only be used within the domain or tier to which they are assigned. In this manner, a portion of the computing nodes may be shared between domains of the entire fabric while other computing nodes may be restricted to particular domains or tiers.

Figure 3:
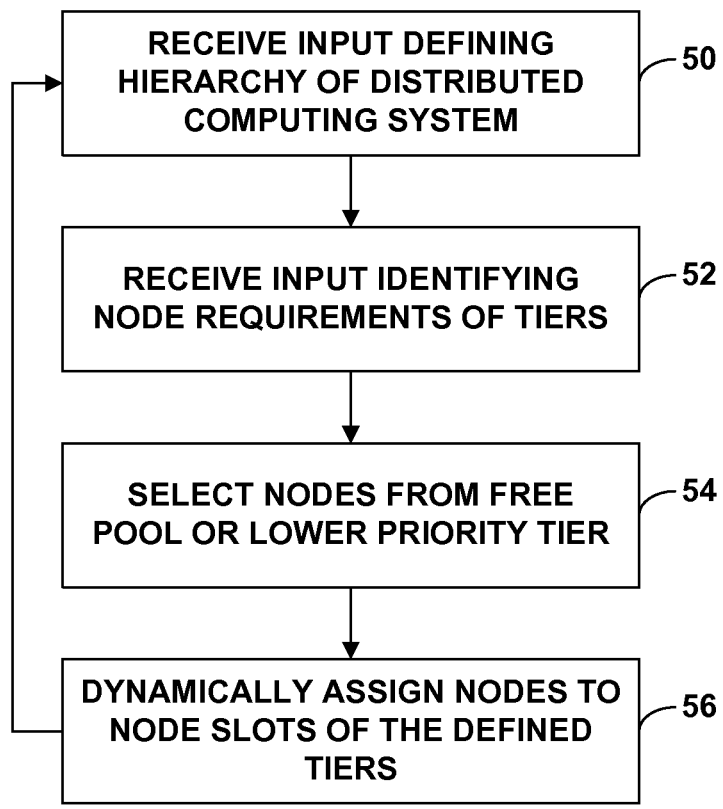
FIG. 3 is a flow diagram that provides a high-level overview of the operation of a control node when configuring the distributed computing system.

FIG. 3 is a flow diagram that provides a high-level overview of the operation of control node 12 when configuring distributed computing system 10. Initially, control node 12 receives input from a system administrator defining the hierarchical organization of distributed computing system 10 (50). In one example, control node 12 receives input that defines a model that specifies a number of hierarchically arranged nodes as described in detail in FIG. 2. Particularly, the defined architecture of distributed computing system 10 includes an overall fabric having a number of hierarchically arranged domains, tiers and node slots.

During this process, control node 12 may receive input specifying node requirements of each of the tiers of the hierarchical model (52). As described above, administrator 20 may specify a list of attributes, e.g., a central processing unit (CPU) count, a CPU speed, an amount of memory (e.g., RAM), or local disk characteristics, that the tiers require of their candidate computing nodes. In addition, control node 12 may further receive user-defined custom attributes, such as requiring the node to have I/O, such as HBA connectivity. The node requirements or attributes defined by system administrator 20 may each include a name used to identify the characteristic, a data type (e.g., integer, long, float or string), and a weight to define the importance of the requirement.

Control node 12 identifies the attributes for all candidate computing nodes within free pool 13 or a lower priority tier (54). As described above, control node 12 may have already discovered the computing nodes and inventoried the candidate computing nodes to identify hardware characteristics of all candidate computing nodes. Additionally, control node 12 may receive input from system administrator 20 identifying specialized capabilities of one or more computing nodes that are not detectable by the inventory process.

Control node 12 dynamically assigns computing nodes to the node slots of each tier based on the node requirements specified for the tiers and the identified node attributes (56). Population of the node slots of the tier may be performed on a tier-by-tier basis beginning with the tier with the highest priority, i.e., the tier with the highest weight assigned to it. As will be described in detail, in one embodiment, control node 12 may populate the node slots of the tiers with the computing nodes that have attributes that most closely match the node requirements of the particular tiers. Thus, the computing nodes may be assigned using a "best fit" algorithm.

Figure 4:
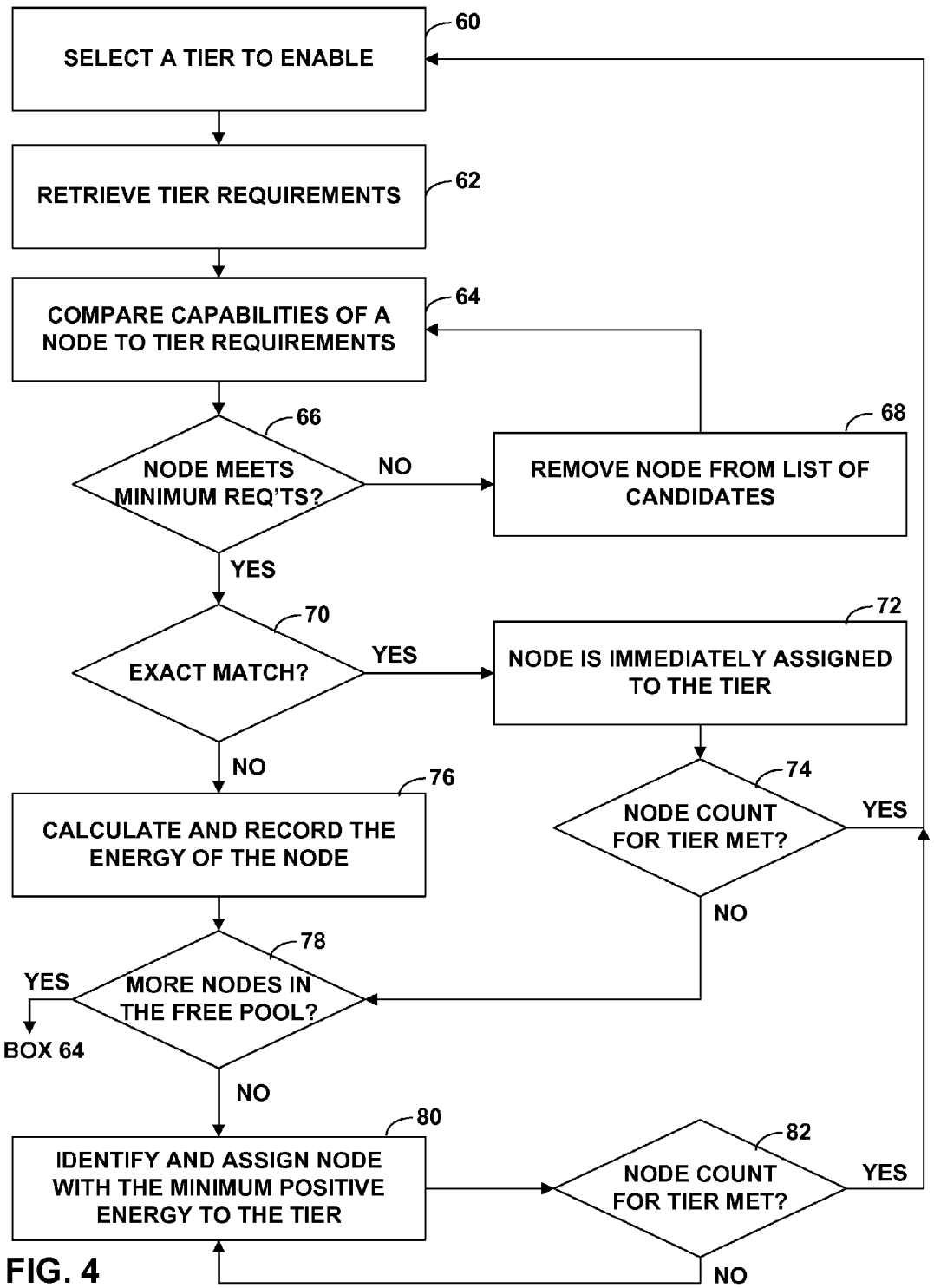
FIG. 4 is a flow diagram illustrating exemplary operation of the control node when assigning computing nodes to node slots of tiers.

FIG. 4 is a flow diagram illustrating exemplary operation of control node 12 when assigning computing nodes to node slots of tiers. Initially, control node 12 selects a tier to enable (60). As described above, control node 12 may select the tier based on a weight or priority assigned to the tier by administrator 20. Control node 12 may, for example, initially select the tier with the highest priority and successively enable the tiers based on priority.

Next, control node 12 retrieves the node requirements associated with the selected tier (62). Control node 12 may, for example, maintain a database having entries for each node slot, where the entries identify the node requirements for each of the tiers. Control node 12 retrieves the node requirements for the selected tier from the database.

In addition, control node 12 accesses the database and retrieves the computing node attributes of one of the unallocated computing nodes of free pool 13. Control node 12 compares the node requirements of the tier to the node attributes of the selected computing node (64).

Based on the comparison, control node 12 determines whether the node attributes of the computing node meets the minimum node requirements of the tier (66). If the node attributes of the selected computing node do not meet the minimum node requirements of the tier, then the computing node is removed from the list of candidate nodes for this particular tier (68). Control node 12 repeats the process by retrieving the node attributes of another of the computing nodes of the free pool and compares the node requirements of the tier to the node attributes of the computing node.

If the node attributes of the selected computing node meet the minimum node requirements of the tier (YES of 66), control node 12 determines whether the node attributes are an exact match to the node requirements of the tier (70). If the node attributes of the selected computing node and the node requirements of the tier are a perfect match (YES of 70), the computing node is immediately assigned from the free pool to a node slot of the tier and the image instance for the slot is associated with the computing node for deployment (72).

Control node 12 then determines whether the node count for the tier is met (74). Control node 12 may, for example, determine whether the tier is assigned the minimum number of nodes necessary to provide adequate processing capabilities. In another example, control node 12 may determine whether the tier is assigned the ideal number of nodes defined by system administrator 20. When the node count for the tier is met, control node 12 selects the next tier to enable, e.g., the tier with the next largest priority, and repeats the process until all defined tiers are enabled, i.e., populated with application nodes (60).

If the node attributes of the selected computing node and the node requirements of the tier are not a perfect match control node 12 calculates and records a "processing energy" of the node (76). As used herein, the term "processing energy" refers to a numerical representation of the difference between the node attributes of a selected node and the node requirements of the tier. A positive processing energy indicates the node attributes more than satisfy the node requirements of the tier. The magnitude of the processing energy represents the degree to which the node requirements exceed the tier requirements.

After computing and recording the processing energy of the nodes, control node 12 determines whether there are more candidate nodes in free pool 13 (78). If there are additional candidate nodes, control node 12 repeats the process by retrieving the computing node attributes of another one of the computing nodes of the free pool of computing nodes and comparing the node requirements of the tier to the node attributes of the computing node (64).

When all of the candidate computing nodes in the free pool have been examined, control node 12 selects the candidate computing node having the minimum positive processing energy and assigns the selected computing node to a node slot of the tier (80). Control node 12 determines whether the minimum node count for the tier is met (82). If the minimum node count for the tier has not been met, control node 12 assigns the computing node with the next lowest calculated processing energy to the tier (80). Control node 12 repeats this process until the node count is met. At this point, control node 12 selects the next tier to enable, e.g., the tier with the next largest priority (60).

In the event there are an insufficient number of computing nodes in free pool 13, or an insufficient number of computing nodes that meet the tier requirements, control node 12 notifies system administrator 20. System administrator 20 may add more nodes to free pool 13, add more capable nodes to the free pool, reduce the node requirements of the tier so more of the unallocated nodes meet the requirements, or reduce the configured minimum node counts for the tiers.

Figure 5:
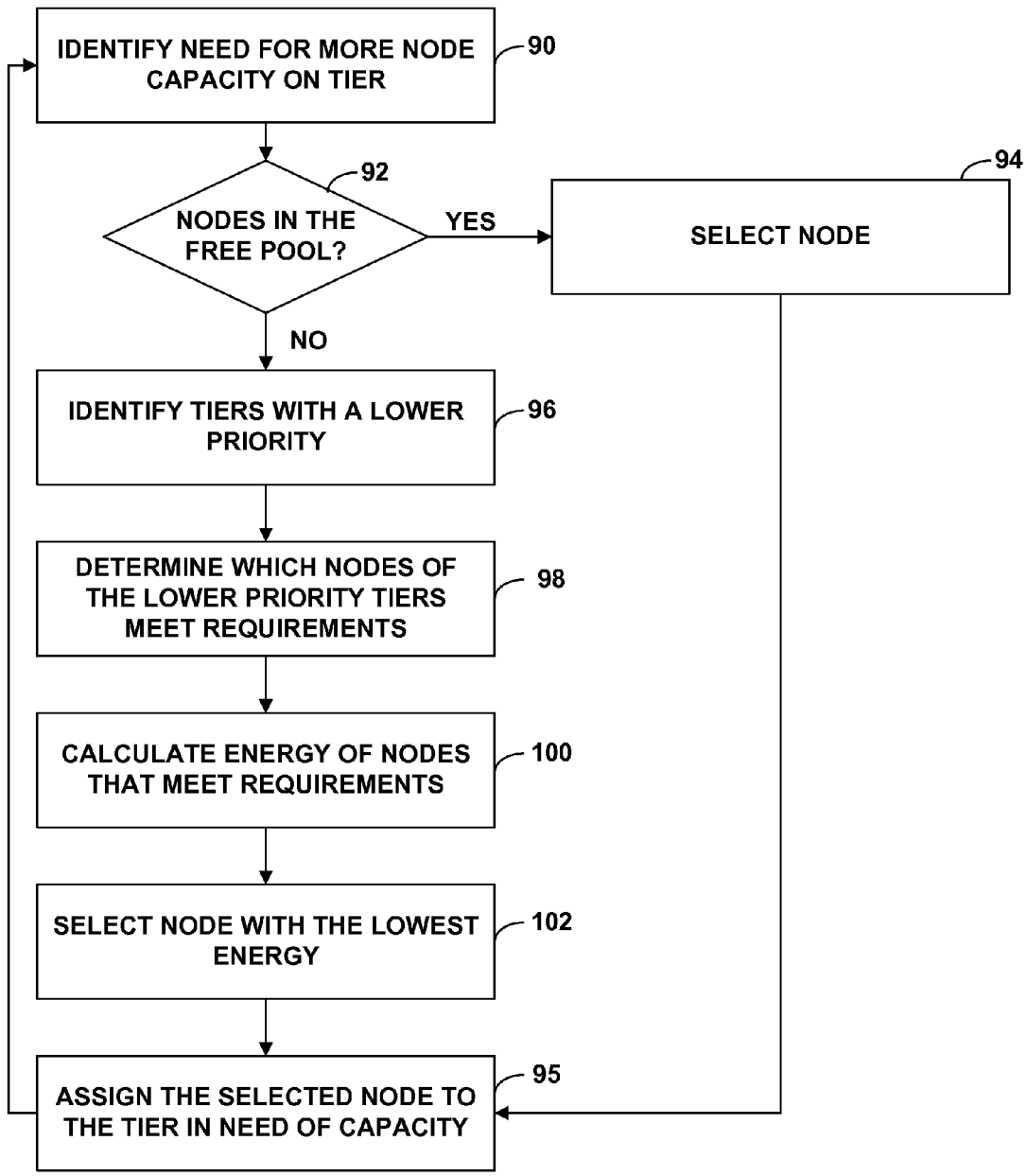
FIG. 5 is a flow diagram illustrating exemplary operation of a control node when adding an additional computing node to a tier to meet additional processing demands.

FIG. 5 is a flow diagram illustrating exemplary operation of control node 12 when adding an additional computing node to a tier to meet increased processing demands. Initially, control node 12 or system administrator 20 identifies a need for additional processing capacity on one of the tiers (90). Control node 12 may, for example, identify a high processing load on the tier or receive input from a system administrator identifying the need for additional processing capacity on the tier.

Control node 12 then determines whether there are any computing nodes in the free pool of nodes that meet the minimum node requirements of the tier (92). When there are one or more nodes that meet the minimum node requirements of the tier, control node 12 selects the node from the free pool based the node requirements of the tier, as described above, (94) and assigns the node to the tier (95). As described in detail with respect to FIG. 4, control node 12 may determine whether there are any nodes that have node attributes that are an exact match to the node requirements of the tier. If an exact match is found, the corresponding computing node is assigned to a node slot of the tier. If no exact match is found, control node 12 computes the processing energy for each node and assigns the computing node with the minimum processing energy to the tier. Control node 12 remotely powers on the assigned node and remotely boots the node with the image instance associated with the node slot. Additionally, the booted computing node inherits the network address associated with the node slot.

If there are no adequate computing nodes in the free pool, i.e., no nodes at all or no nodes that match the minimal node requirements of the tier, control node 12 identifies the tiers with a lower priority than the tier needing more processing capacity (96).

Control node 12 determines which of the nodes of the lower priority tiers meet the minimum requirements of the tier in need of processing capacity (98). Control node 12 may, for example, compare the attributes of each of the nodes assigned to node slots of the lower priority tiers to the node requirements of the tier in need of processing capacity. Lower priority tiers that have the minimum number of computing nodes may be removed from possible tiers from which to harvest an application node. If, however, all the lower priority tiers have the minimum number of computing nodes defined for the respective tier, the lowest priority tier is selected from which to harvest the one or more nodes.

Control node 12 calculates the processing energy of each of the nodes of the lower priority tiers that meet the minimum requirements (100). The energies of the nodes are calculated using the differences between the node attributes and the node requirements of the tier needing additional capacity. Control node 12 selects the computing node with the lowest processing energy that meets the minimum requirements, and assigns the selected computing node to the tier in need of processing capacity (102, 95).

Figure 6:
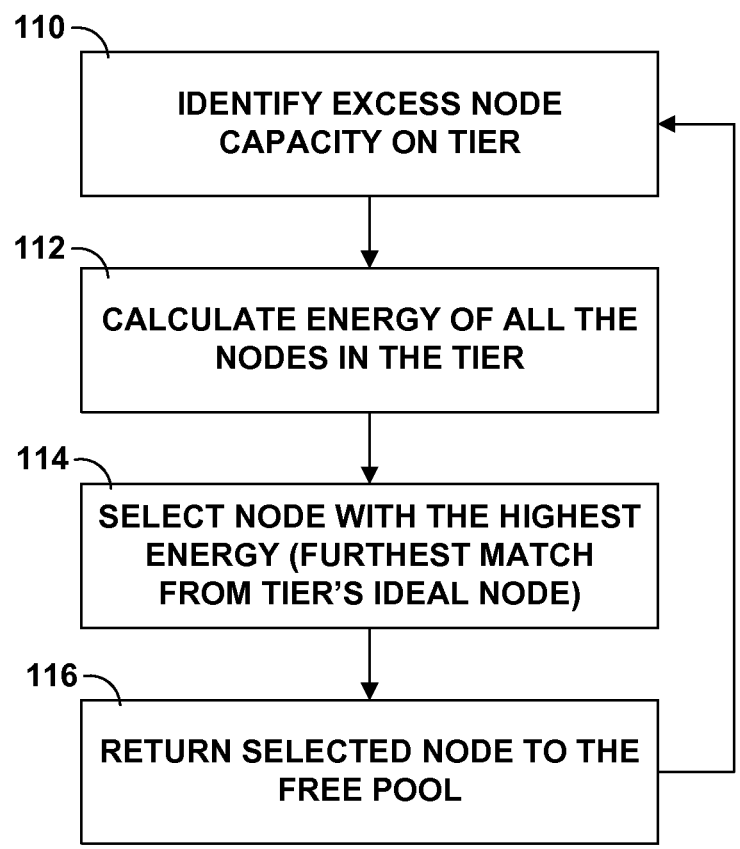
FIG. 6 is a flow diagram illustrating exemplary operation of a control node harvesting excess node capacity from one of the tiers and returning the harvested computing node to the free pool.

FIG. 6 is a flow diagram illustrating exemplary operation of control node 12 when harvesting excess node capacity from one of the tiers and returning the harvested computing node to free pool 13. Initially, control node 12 identifies a tier having excess node capacity (110). Control node 12 may, for example, periodically check the node capacity of the tiers to identify any tiers having excess node capacity. Performing a periodic check and removal of excess nodes increases the likelihood that a capable computing node will be in free pool 13 in the event one of the tiers needs additional node capacity.

When harvesting a node, control node 12 calculates the processing energy of all the nodes in the tier as described above with reference to FIG. 4 (112). Control node 12 identifies the node within the tier with the highest processing energy and returns the identified node to the free pool of nodes (114, 116). As described above, the node with the highest processing energy corresponds to the node whose node attributes are the most in excess of the node requirements of the tier.

Returning the node to the free pool may involve remotely powering off the computing node and updating the database to associate the harvested node with free pool 13. In addition, control node 12 updates the database to disassociate the returned node with the node slot to which it was assigned. At this point, the node no longer uses the network address associated with the image instance mapped to the node slot. Control node 12 may, therefore, assign a temporary network address to the node while the node is assigned to free pool 13.

Figure 7:
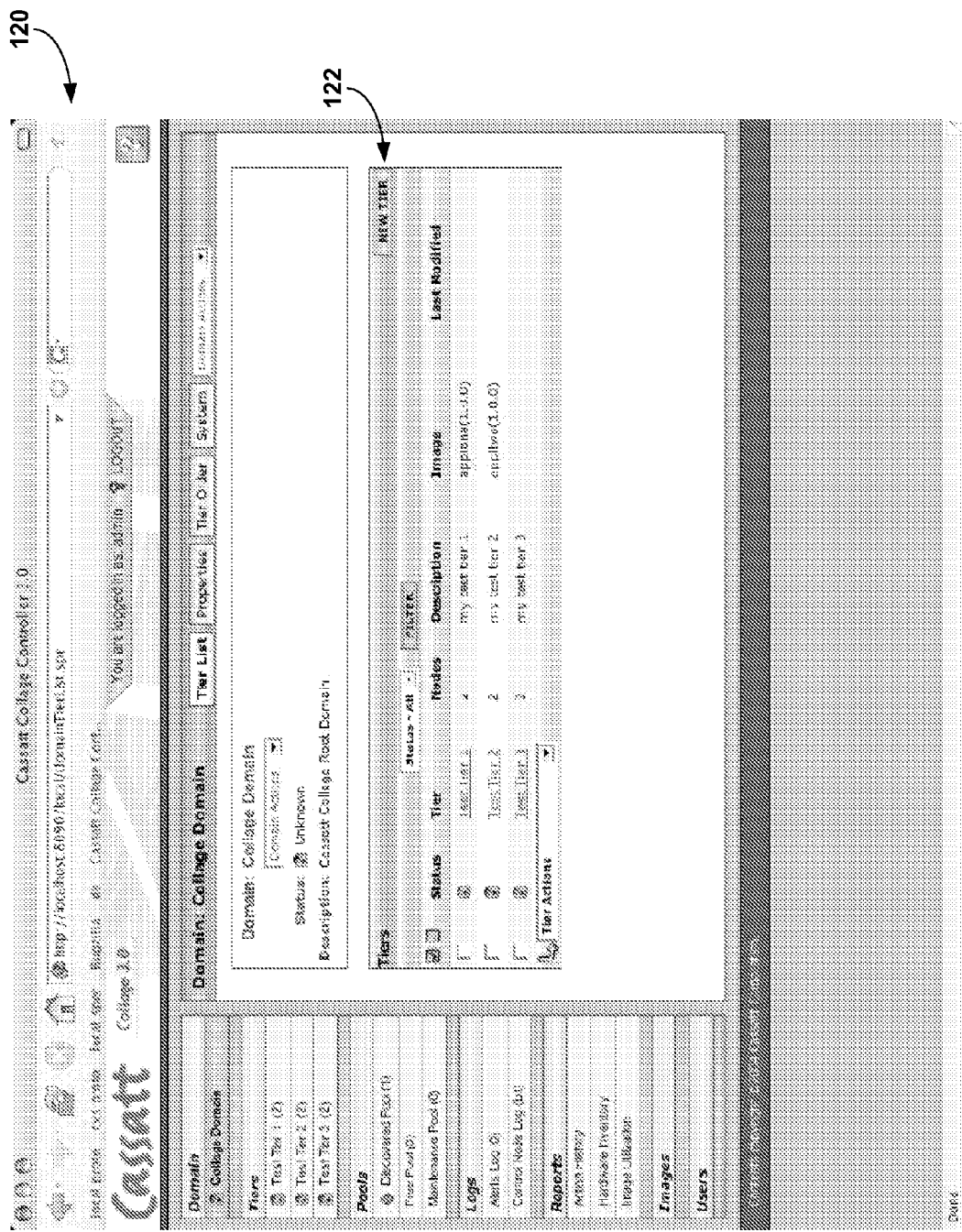
FIG. 7 is a screen illustration of an exemplary user interface for defining tiers in a particular domain.

FIG. 7 is a screen illustration of an exemplary user interface 120 presented by control node 12 with which administrator 20 interacts to define tiers for a particular domain. In the example illustrated in FIG. 7, system administrator 20 has selected the "Collage Domain." User interface 120 presents the tiers that are currently in the selected domain. In the example illustrated, the Collage Domain includes three tiers, "test tier 1," "test tier 2," and "test tier 3." As shown in FIG. 7, in this example, each of the tiers includes two nodes. In addition, user interface 120 lists the type of software image currently deployed to application nodes for each of the tiers. In the example illustrated, image "applone (1.0.0)" is deployed to the nodes of test tier 1 and image "appltwo (1.0.0)" is deployed to the nodes of test tier 2. System administrator 20 may add one or more tiers to the domain by clicking on new tier button 122.

Figure 8:
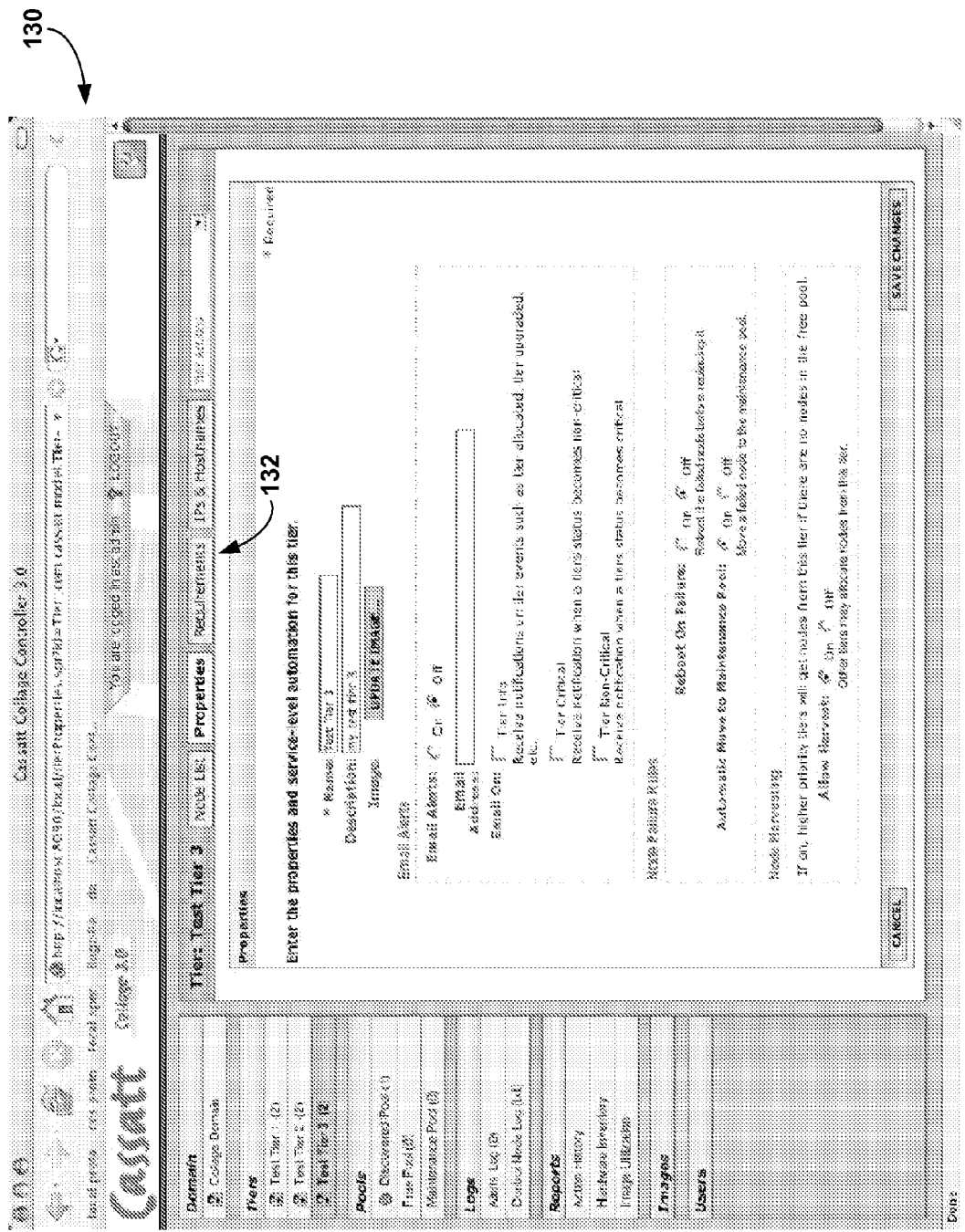
FIG. 8 is a screen illustration of an exemplary user interface for defining properties of the tiers.

FIG. 8 is a screen illustration of an exemplary user interface 130 for defining properties of the tiers. In particular, user interface 130 allows system administrator 20 to input a name for the tier, a description of the tier, and an image associated with the tier. The image associated with the tier refers to a golden image from which image instances are generated and deployed to the nodes assigned to the tier.

When configuring a tier, system administrator 20 may elect to activate email alerts. For example, system administrator 20 may activate the email alerts feature in order to receive email alerts providing system administrator 20 with critical and/or non-critical tier information, such as a notification that a tier has been upgraded, a node of the tier has failed or the like. Furthermore, system administrator 20 may input various policies, such node failure rules. For example, system administrator 20 may identify whether control node 12 should reboot a node in case of failure or whether the failed node should automatically be moved to maintenance pool 17. Similarly, system administrator 20 may identify whether nodes assigned to the tier may be harvested by other tiers.

User interface 130 may also allow system administrator 20 to input node requirements of a tier. In order to input node requirements of a tier, system administrator 20 may click on the "Requirements" tab 132, causing user interface 130 to present an input area to particular node requirements of the tier.

Figure 9:
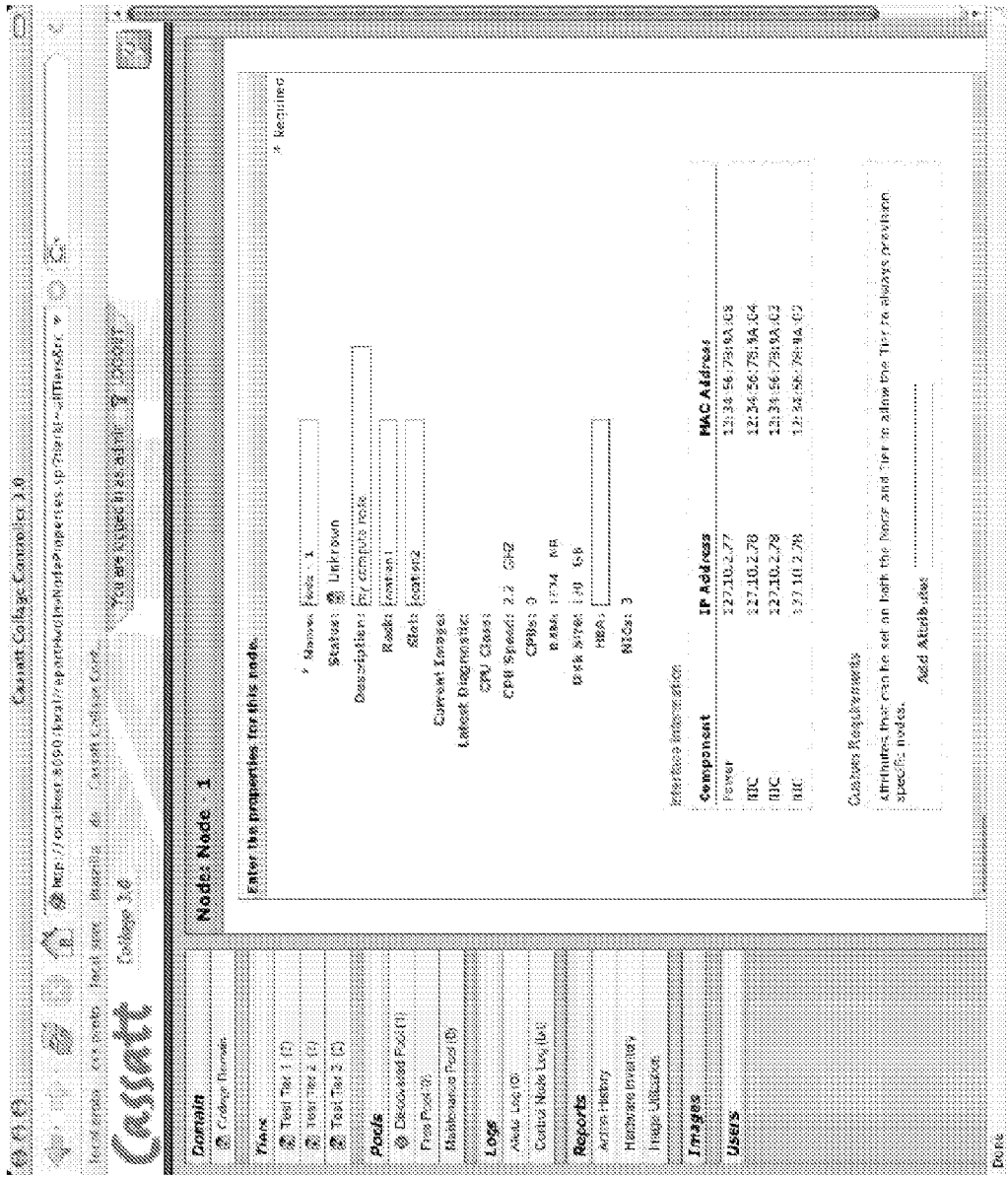
FIG. 9 is a screen illustration of an exemplary user interface for viewing and identify properties of a computing node.

FIG. 9 is a screen illustration of an exemplary user interface 140 for viewing and identifying properties of a computing node. User interface 140 allows system administrator 20 to define a name, description, and location (including a rack and slot) of a computing node. In addition user interface 140 may specify user-defined properties of a node, such as whether the computing node has I/O HBA capabilities.

User interface 140 also displays properties that control node 12 has identified during the computing node inventory process. In this example, user interface 140 presents system administrator 20 with the a CPU node count, a CPU speed, the amount of RAM, the disk size and other characteristics that are identifiable during the automated node inventory. User interface 140 additionally presents interface information to system administrator 20. Specifically, user interface 140 provides system administrator 20 with a list of components and their associated IP and MAC addresses.

User interface 140 also allows system administrator 20 to define other custom requirements. For example, system administrator 20 may define one or more attributes and add those attributes to the list of node attributes presented to system administrator 20.

Figure 10:
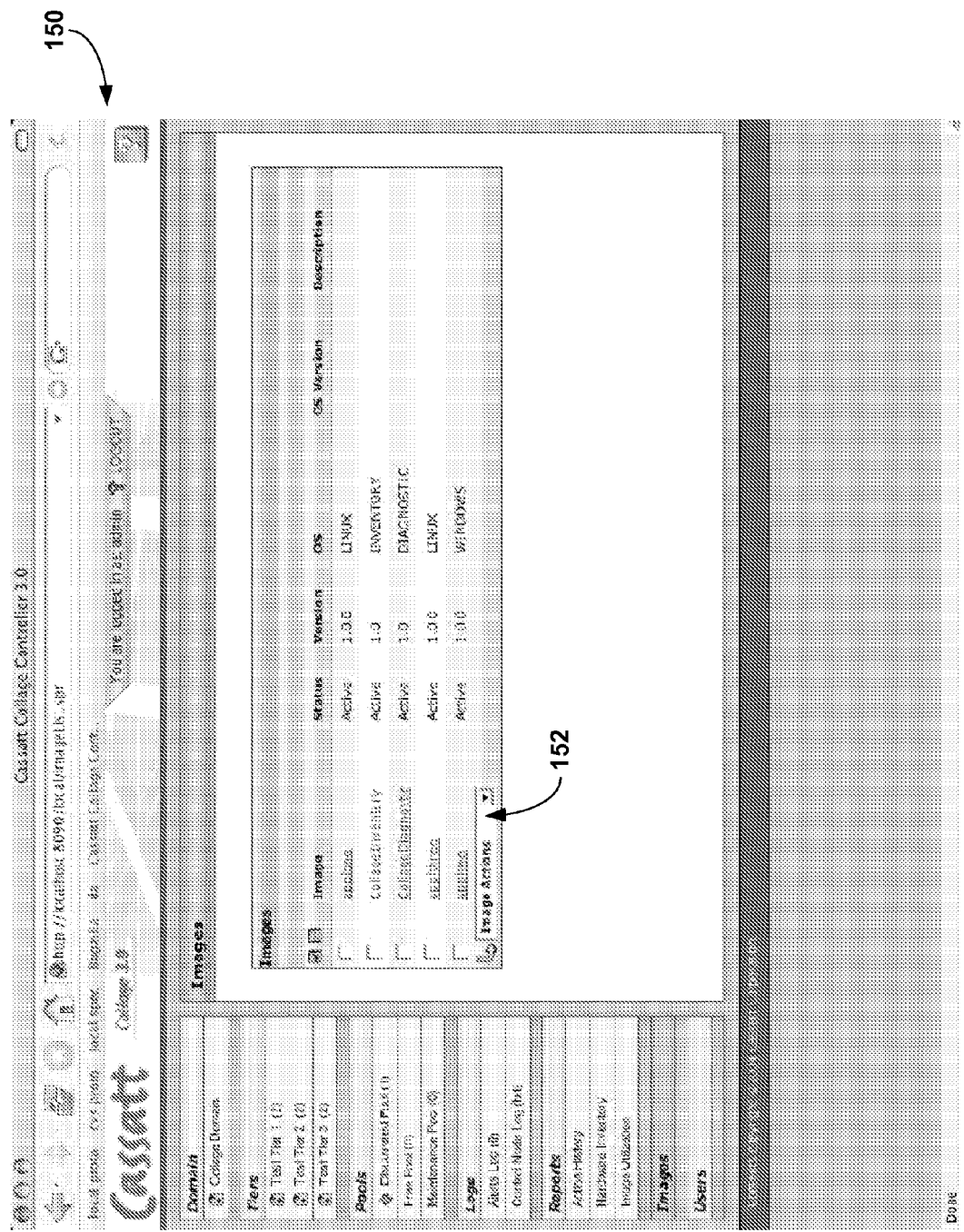
FIG. 10 is a screen illustration of an exemplary user interface for viewing software images.

FIG. 10 is a screen illustration of an exemplary user interface 150 for viewing software images. User interface 150 presents to a system administrator or another user a list of images maintained by control node 12 within image repository 26. The image list further includes the status of each image (i.e., either active or inactive), the version of the image, the operating system on which the image should be run, the operating system version on which the image should be run and a brief description of the image.

System administrator 20 or another user may select an image by clicking on the box in front of the image identifier/name and perform one or more actions on the image. Actions that system administrator 20 may perform on an image include deleting the image, updating the image, and the like. System administrator 20 may select one of the image actions via dropdown menu 152. In some embodiments, user interface 150 may further display other details about the images such as the node to which the images are assigned (if the node status is "active"), the network address associated with the images and the like.

Figure 11:
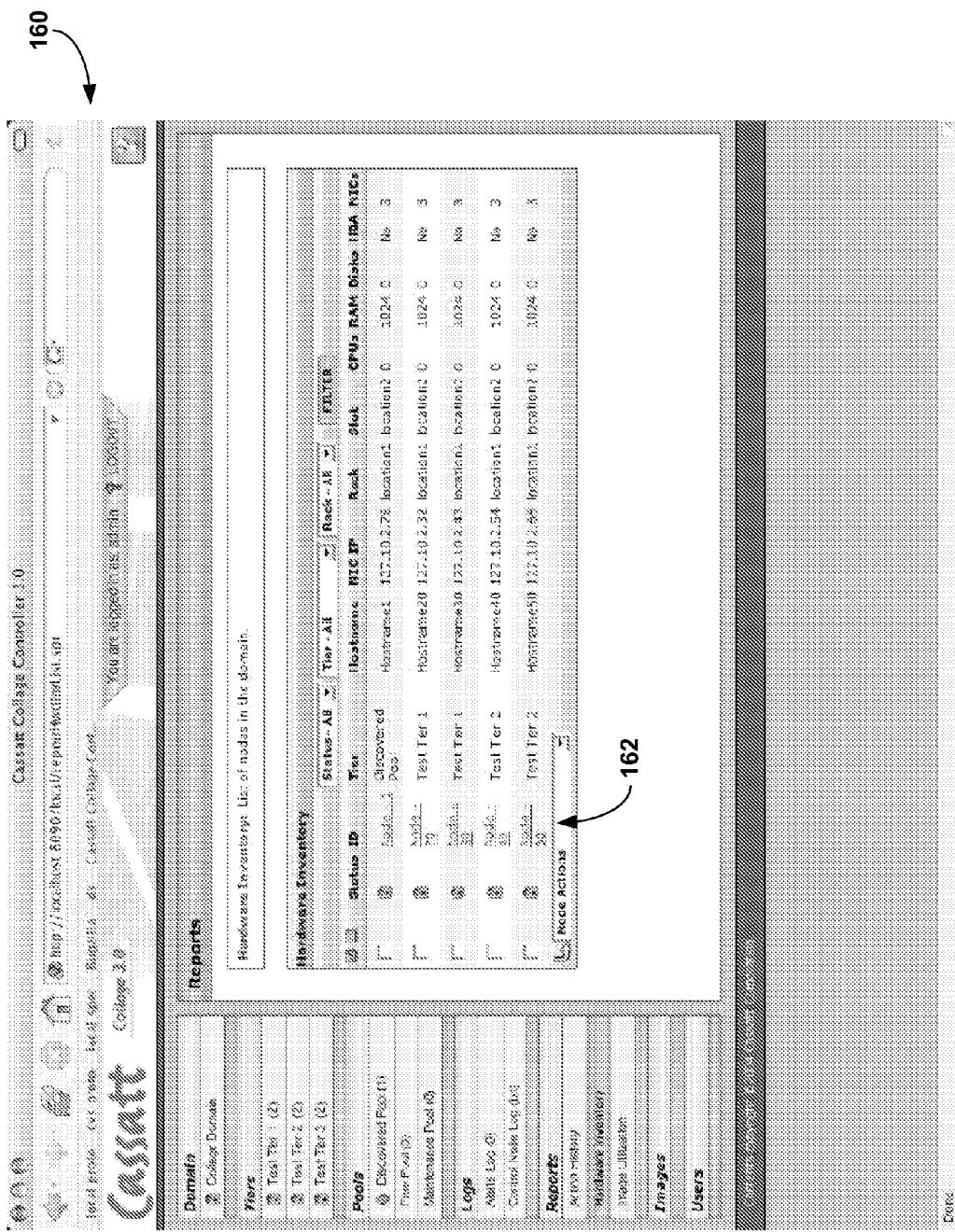
FIG. 11 is a screen illustration of an exemplary user interface for viewing a hardware inventory report.

FIG. 11 is a screen illustration of an exemplary user interface 160 for viewing a hardware inventory report. User interface 160 presents to system administrator 20 or another user a list of the nodes that are currently assigned to a domain. System administrator 20 may elect to view the nodes for the entire domain, for a single tier within the domain or for a single rack within a tier.

For each node, user interface 160 presents a node ID, a status of the node, the tier to which the node belongs, a hostname associated with the node, a NIC IP address, a rack location, a slot location, the number of CPU's of the node, the amount of RAM on the node, the number of disks on the node, whether the node has I/O HBA, and the number of NICs of the node.

System administrator 20 or other user may select a node by clicking on the box in front of the node identifier/name and perform one or more actions on the node. Actions that system administrator 20 may perform on the node include deleting the node, updating the node attributes or other properties of the node, and the like. System administrator 20 may select one of the node actions via dropdown menu 162.

Figure 12:
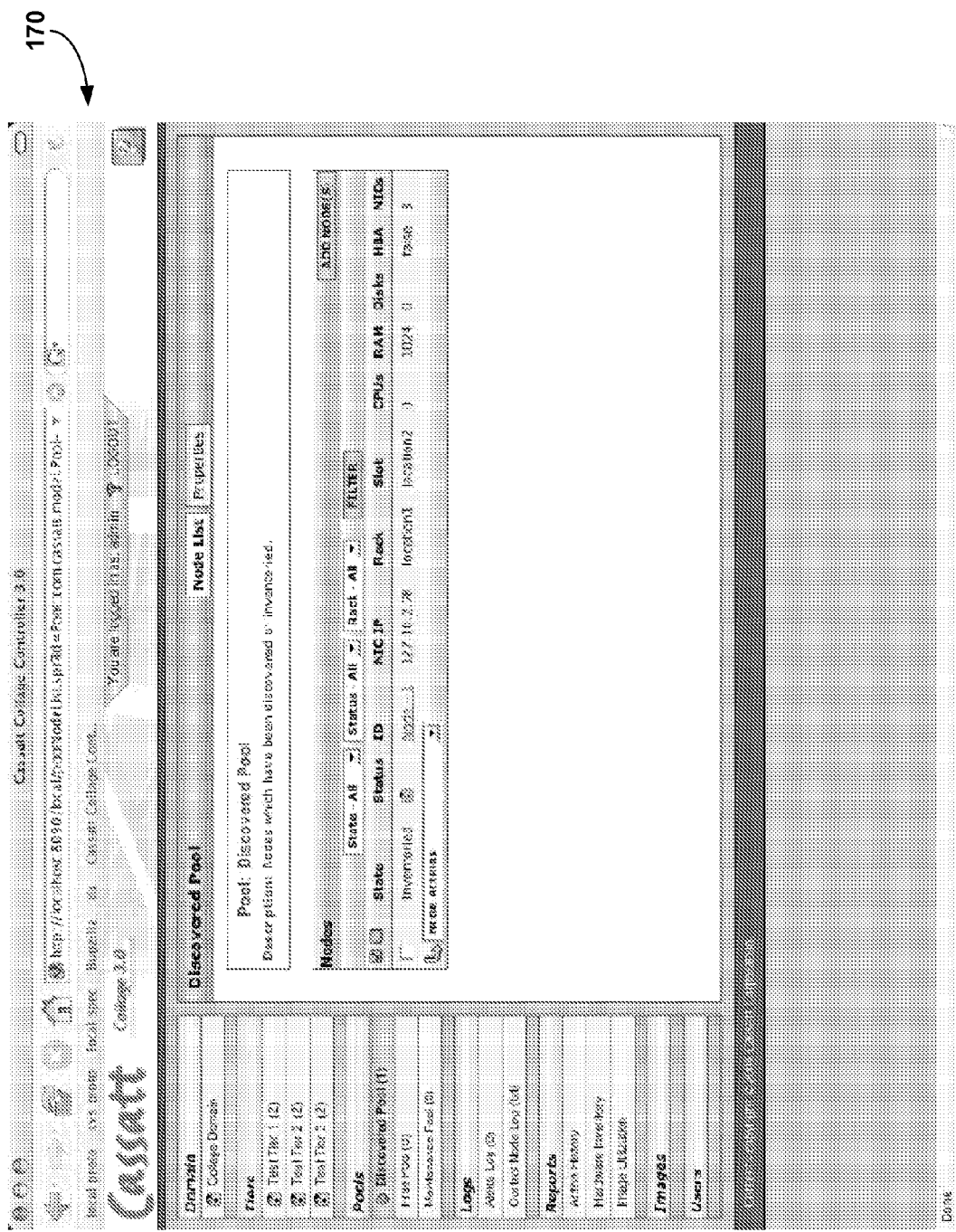
FIG. 12 is a screen illustration of an exemplary user interface for viewing discovered nodes that are located in the free pool.

FIG. 12 is a screen illustration of an exemplary user interface 170 for viewing discovered nodes that are located in discovered pool 11. For each node, user interface 170 presents a node ID, a state of the node, a NIC IP address, a rack location, a slot location, the number of CPU's of the node, the amount of RAM on the node, the number of disks on the node, whether the node has I/O HBA, and the number of NICs of the node.

Figure 13:
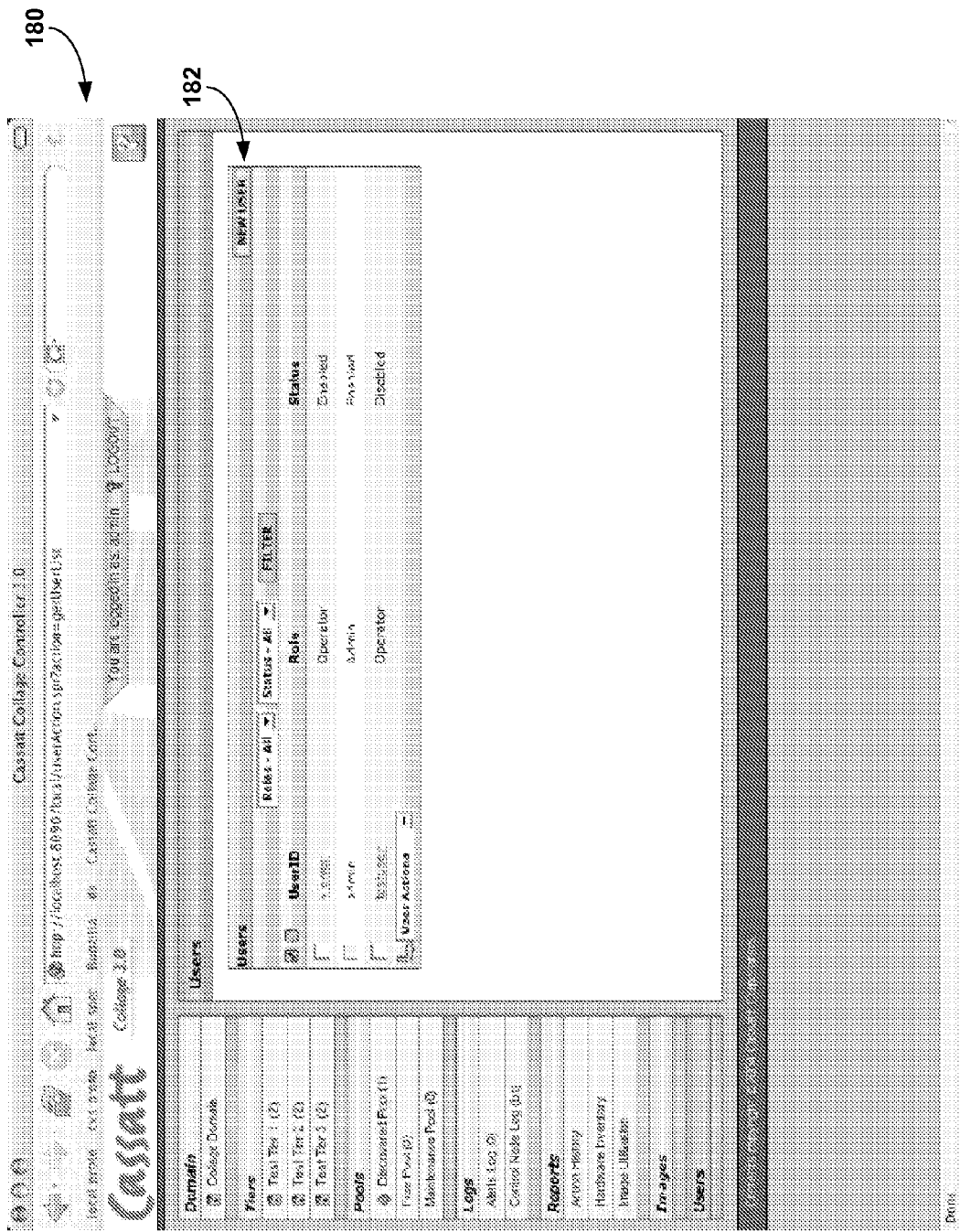
FIG. 13 is a screen illustration of an exemplary user interface for viewing users of a distributed computing system.

FIG. 13 is a screen illustration of an exemplary user interface 180 for viewing users of distributed computing system 10. User interface 180 presents a list of users as well as the role assigned to each of the users and the status of each of the users. Thus, system administrator 20 may define different roles to each of the users. For example, a user may be either an operator (i.e., general user) or an administrator. System administrator 20 may add a new user to the list of users by clicking on the "New User" button 182.

Figure 14:
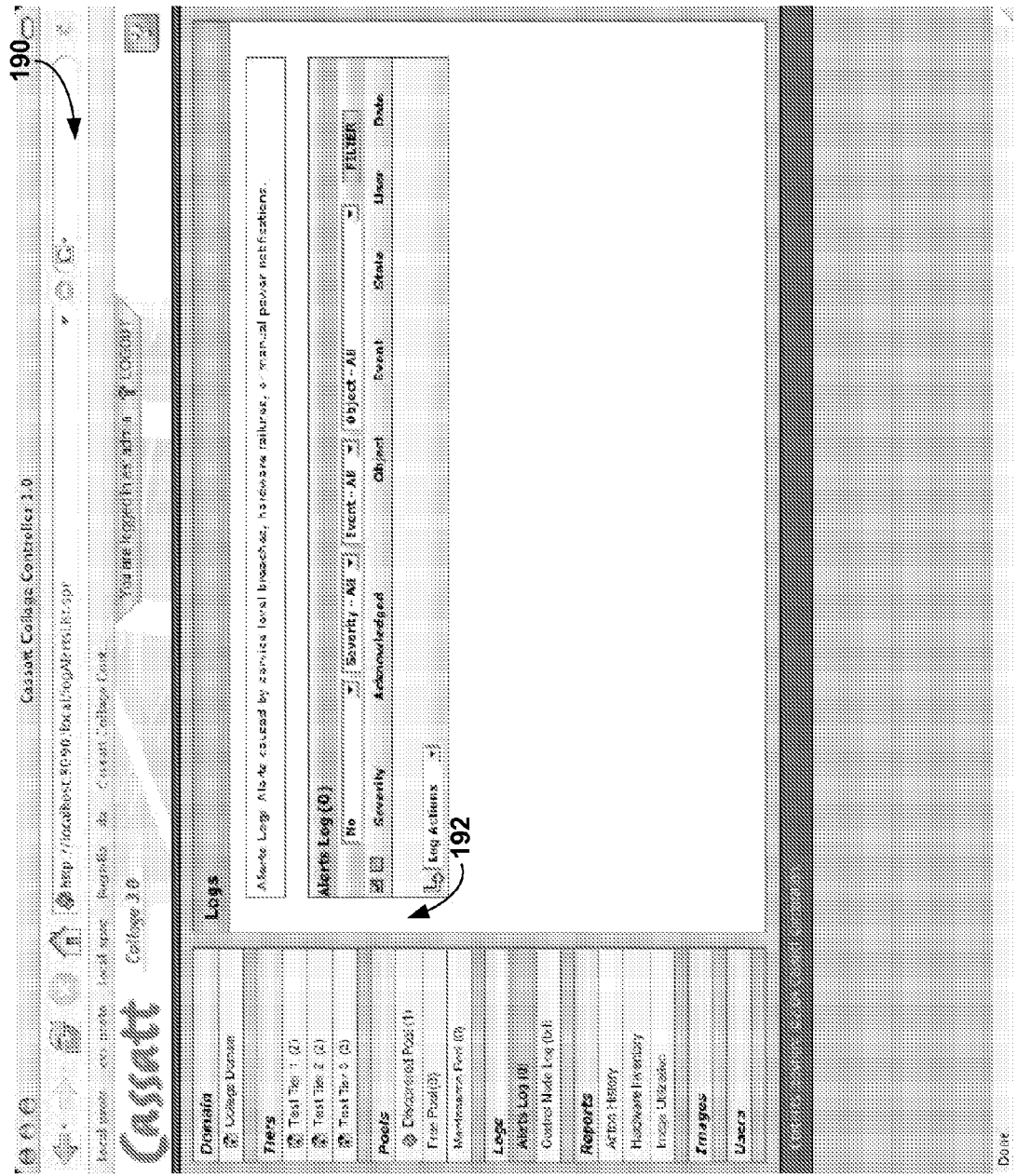
FIG. 14 is a screen illustration of an exemplary user interface for viewing alerts for the distributed computing system.

FIG. 14 is a screen illustration of an exemplary user interface 190 for viewing alerts for distributed computing system 10. For each of the alerts, user interface 190 identifies the severity of the alert, whether the alert has been acknowledged, an object associated with the alert, an event associated with the alert, a state of the alert, a user associated with the alert and a date associated with the alert.

System administrator 20 or other user may select an alert by clicking on the box in front of the logged alert and perform one or more actions on the logged alert. Actions that system administrator 20 may perform include deleting the alert, changing the status of the alert, or the like. System administrator 20 may specify the log actions via dropdown menu 192.

Figure 15:
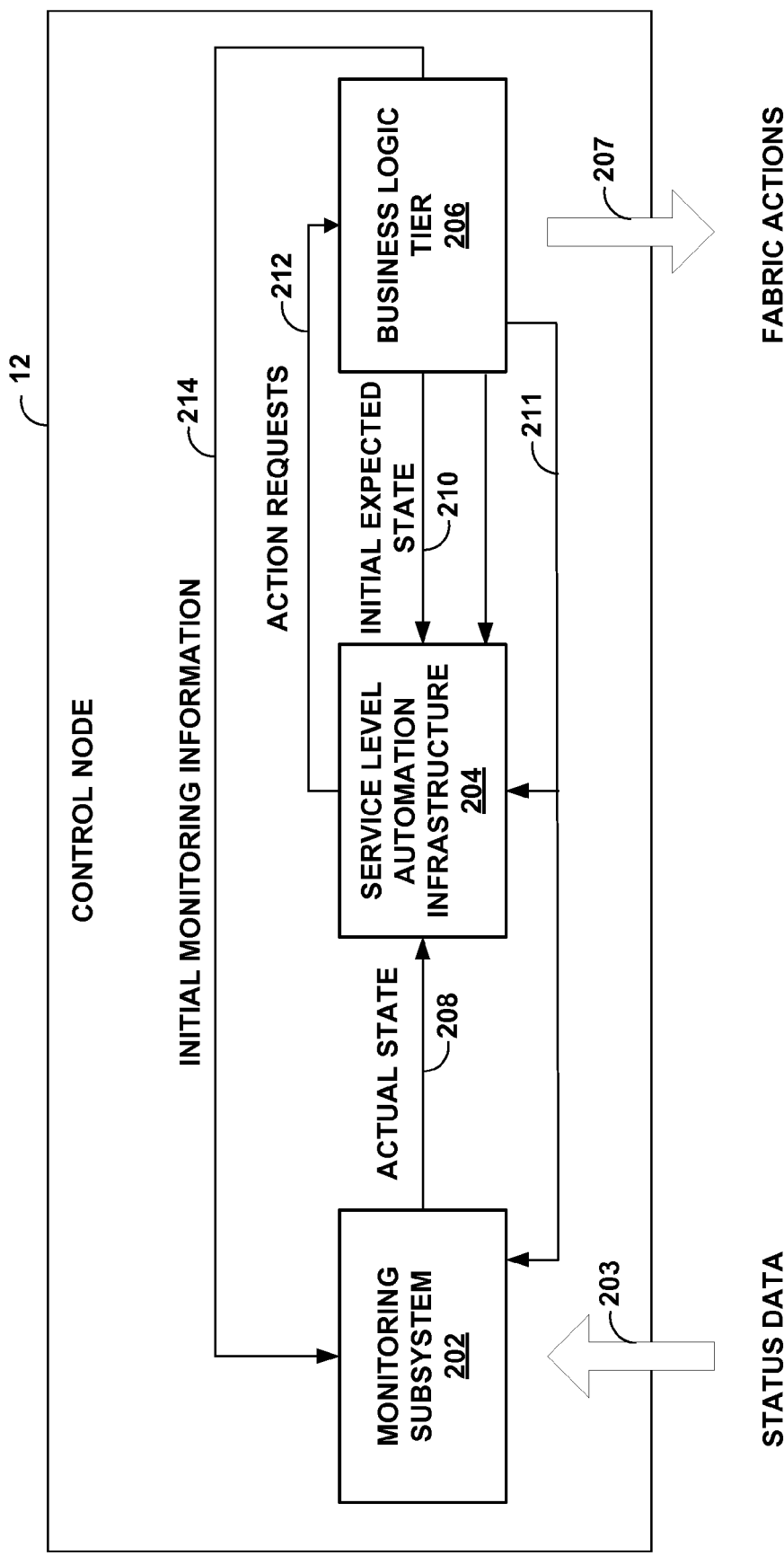
FIG. 15 is a block diagram illustrating one embodiment of control node that includes a monitoring subsystem, a service level automation infrastructure (SLAI), and a business logic tier (BLT).

FIG. 15 is a block diagram illustrating one embodiment of control node 12 in further detail. In the illustrated example, control node 12 includes a monitoring subsystem 202, a service level automation infrastructure (SLAI) 204, and a business logic tier (BLT) 206.

Monitoring subsystem 202 provides real-time monitoring of the distributed computing system 10. In particular, monitoring subsystem 202 dynamically collects status data 203 from the hardware and software operating within distributed computing system 10, and feeds the status data in the form of monitor inputs 208 to SLAI 204. Monitoring inputs 208 may be viewed as representing the actual state of the fabric defined for the organizational model implemented by distributed computing system 10. Monitoring subsystem 202 may utilize well defined interfaces, e.g., the Simple Network Management Protocol (SNMP) and the Java Management Extensions (JMX), to collect and export real-time monitoring information to SLAI 204.

SLAI 204 may be viewed as an automation subsystem that provides support for autonomic computing and acts as a central nervous system for the controlled fabric. In general, SLAI 204 receives monitoring inputs 208 from monitoring subsystem 202, analyzes the inputs and outputs appropriate action requests 212 to BLT 206. In one embodiment, SLAI 204 is a cybernetic system that controls the defined fabric via feedback loops. More specifically, administrator 20 may interact with BLT 206 to define an expected state 210 for the fabric. BLT 206 communicates expected state 210 to SLAI 204. SLAI 204 receives the monitoring inputs from monitoring subsystem 202 and applies rules to determine the most effective way of reducing the differences between the expected and actual states for the fabric.

For example, SLAI 204 may apply a rule to determine that a node within a high priority tier has failed and that the node should be replaced by harvesting a node from a lower priority tier. In this example, SLAI 204 outputs an action request 212 to invoke BLT 206 to move a node from one tier to the other.

In general, BLT 206 implements high-level business operations on fabrics, domains and tiers. SLAI 204 invokes BLT 206 to bring the actual state of the fabric into accordance with the expected state. In particular, BLT 206 outputs fabric actions 207 to perform the physical fabric changes. In addition, BLT 206 outputs an initial expected state 210 to SLAI 204 and initial monitoring information 214 to SLAI 204 and monitoring subsystem 202, respectively. In addition, BLT 206 outputs notifications 211 to SLAI 204 and monitoring subsystem 202 to indicate the state and monitoring changes to distributed computing system 10. As one example, BLT 206 may provide control operations that can be used to replace failed nodes. For example, BLT 206 may output an action request indicating that a node having address 10.10.10.10 has been removed from tier ABC and a node having address 10.10.10.11 has been added to tier XYZ. In response, monitoring subsystem 202 stops attempting to collect status data 203 from node 10.10.10.10 and starts monitoring for status data from node 10.10.10.11. In addition, SLAI 204 updates an internal model to automatically associate monitoring inputs from node 10.10.10.11 with tier XYZ.

Figure 16:
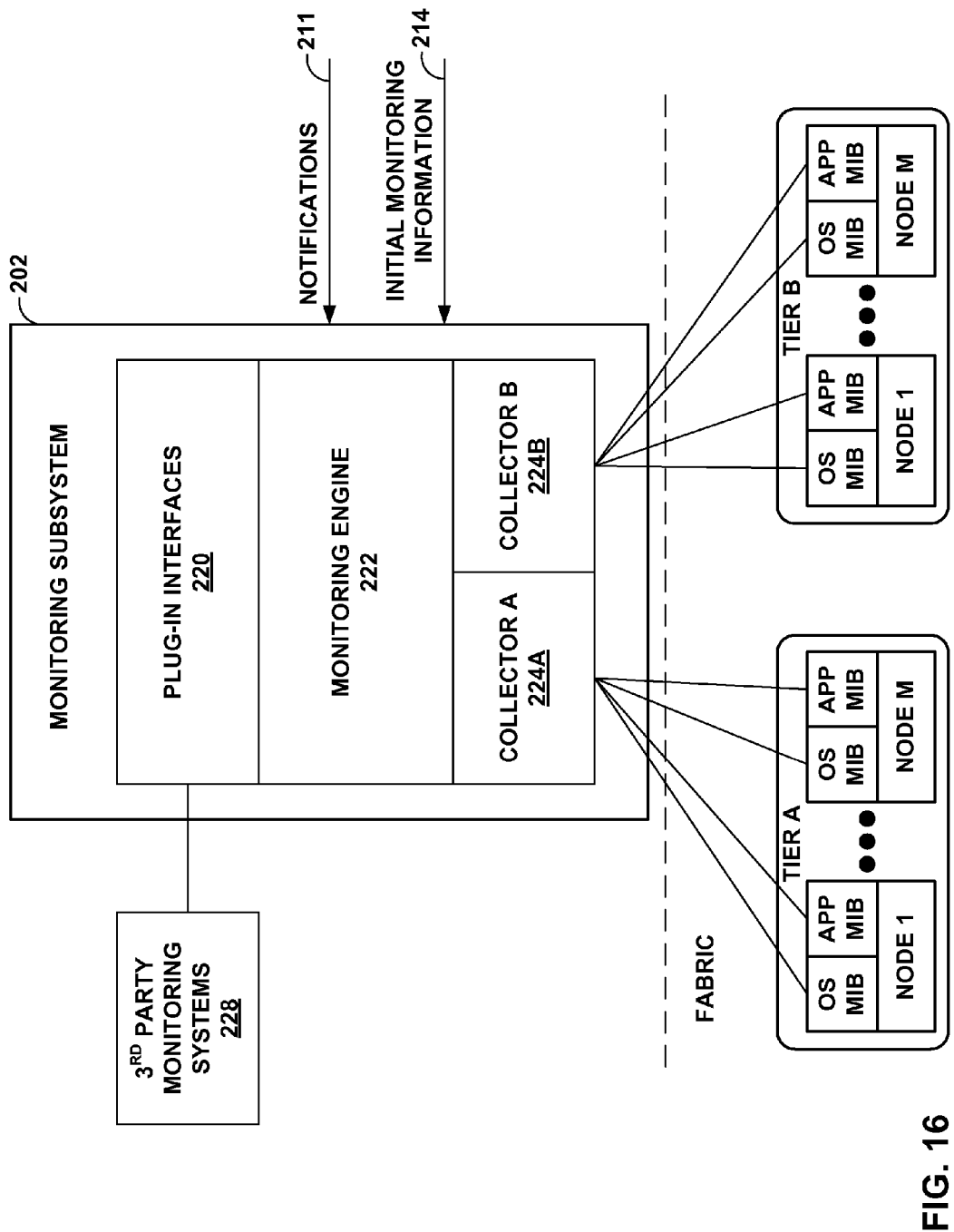
FIG. 16 is a block diagram illustrating one embodiment of the monitoring subsystem.

FIG. 16 is a block diagram illustrating one embodiment of monitoring subsystem 202. In general, monitoring subsystem 202 dynamically detects and monitors a variety of hardware and software components within the fabric. For example, monitoring subsystem 202 identifies, in a timely and efficient manner, any computing nodes that have failed, i.e., any node that does not respond to a request to a known service. More generally, monitoring subsystem 202 provides a concise, consistent and constantly updating view of the components of the fabric.

As described further below, monitoring subsystem 202 employs a modular architecture that allows new detection and monitoring collectors 224 to be "plugged-in" for existing and new protocols and for existing and new hardware and software. As illustrated in FIG. 16, monitoring subsystem 202 provides a plug-in architecture that allows different information collectors 224 to be installed. In general, collectors 224 are responsible for protocol-specific collection of monitoring information. The plug-in architecture allows for new protocols to be added by simply adhering to a collector plug-in signature. In this example, monitoring subsystem 202 includes collectors 224A and 224B for collecting information from operating systems and applications executing on nodes within tier A and tier B, respectively.

In one embodiment, collectors 224 are loaded at startup of control node 12 and are configured with information retrieved from BLT 206. Monitoring engine 222 receives collection requests from SLAI 204, sorts and prioritizes the requests, and invokes the appropriate one of collectors 224 based on the protocol specified in the collection requests. The invoked collector is responsible for collecting the required status data and returning the status data to monitoring engine 222. If the collector is unable to collect the requested status data, the collector returns an error code.

In one embodiment, collectors 224 are Java code compiled into a jar file and loaded with a class loader at run time. Each of collectors 224 has an associated configuration file written in a data description language, such as the extensible markup language (XML). In addition, a user may interact with BLT 206 to add run-time configuration to dynamically configure collectors 224 for specific computing environments. Each of collectors 224 expose an application programming interface (API) to monitoring engine 222 for communication and data exchange.

A user, such as a system administrator, specifies the protocol or protocols to be used for monitoring a software image when the image is created. In addition, the users may specify the protocols to be used for monitoring the nodes and each service executing on the nodes. Example protocols supported by the collectors 224 include Secure Shell (SSH), Simple Network Management Protocol (SNMP), Internet Control Message Protocol (ICMP) ping, Java Management Extensions (JMX) and the Hypertext Transfer Protocol (HTTP).

Some protocols require special privileges, e.g., root privileges, to perform the required data collection. In this case, the corresponding collectors 224 communicate with a separate process that executes as the root. Moreover, some protocols may require deployment and/or configuration of data providers within the fabric. Software agents may, for example, be installed and configured on nodes and configured on other hardware. If needed, custom in-fabric components may be deployed.

In this example, the modular architecture of monitoring subsystem 202 also supports one or more plug-in interfaces 220 for data collection from a wide range of third-party monitoring systems 228. Third-party monitoring systems 228 monitor portions of the fabric and may be vendor-specific.

Figure 17:
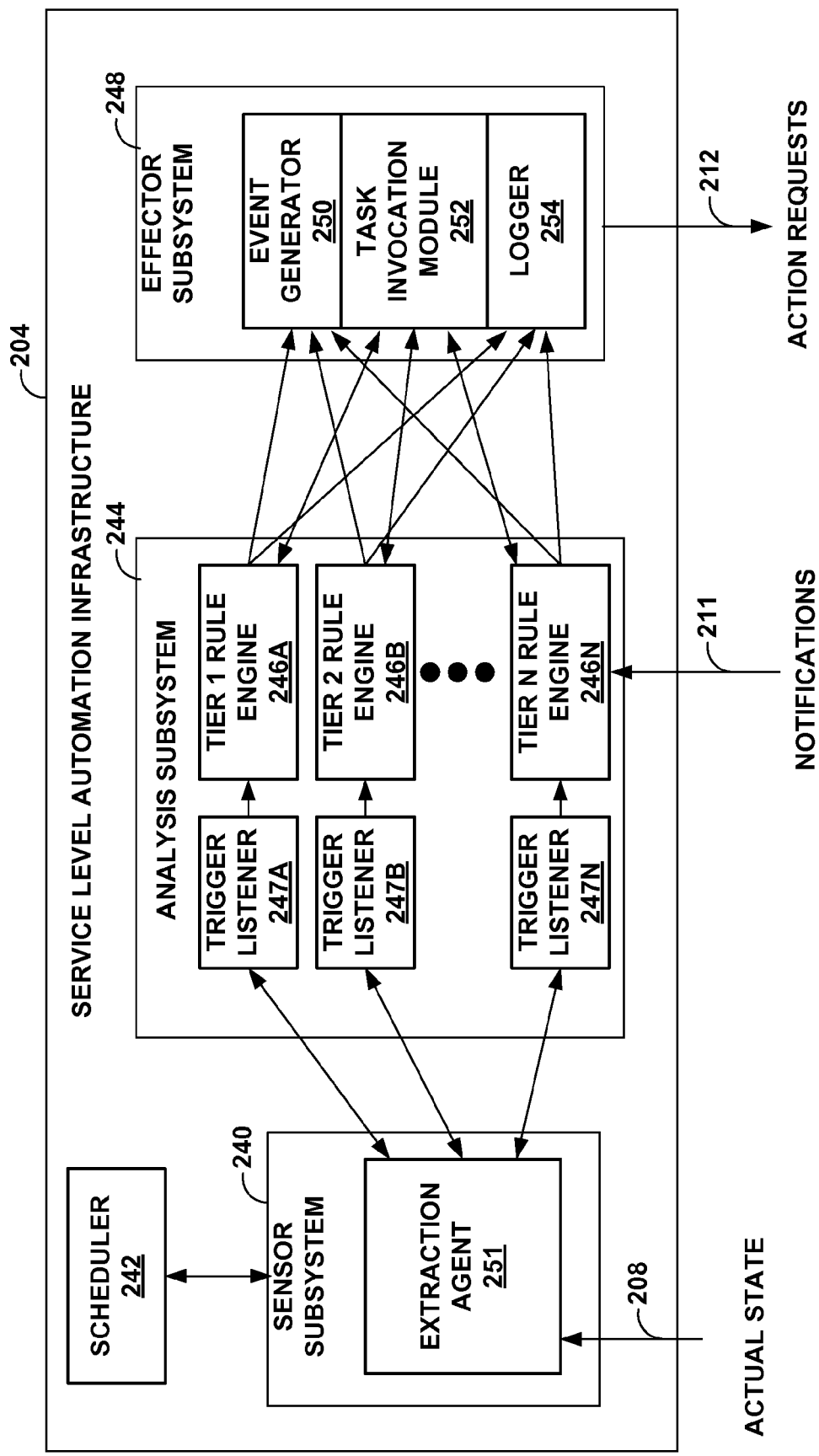
FIG. 17 is a block diagram illustrating one embodiment of the SLAI in further detail.

FIG. 17 is a block diagram illustrating one embodiment of SLAI 204 in further detail. In the illustrated embodiment, SLAI 204 is composed of three subsystems: a sensor subsystem 240, an analysis subsystem 244 and an effector subsystem 248.

In general, sensor subsystem 240 receives actual state data from monitoring subsystem 202 in the form of monitoring inputs 208 and supplies ongoing, dynamic input data to analysis subsystem 244. For example, sensor subsystem 240 is notified of physical changes to distributed computing system 10 by monitoring subsystem 202. Sensor subsystem 240 uses the state data received from monitoring subsystem 202 to maintain ongoing, calculated values that can be sent to analysis subsystem 244 in accordance with scheduler 242.

In one embodiment, sensor subsystem 240 performs time-based hierarchical data aggregation of the actual state data in accordance with the defined organization model. Sensor subsystem 240 maintains organizational data in a tree-like structure that reflects the current configuration of the hierarchical organization model. Sensor subsystem 240 uses the organizational data to perform the real-time data aggregation and map tiers and domains to specific nodes. Sensor subsystem 240 maintains the organizational data based on notifications 211 received from BLT 206.

Sensor subsystem 240 sends inputs to analysis subsystem 244 to communicate the aggregated data on a periodic or event-driven basis. Analysis subsystem 244 may register an interest in a particular aggregated data value with sensor subsystem 240 and request updates at a specified frequency. In response, sensor subsystem 240 interacts with monitoring subsystem 202 and scheduler 242 to generate the aggregated data required by analysis subsystem 244.

Sensor subsystem 240 performs arbitrary data aggregations via instances of plug-in classes (referred to as "triggers") that define the aggregations. Each trigger is registered under a compound name based on the entity being monitored and the type of data being gathered. For example, a trigger may be defined to aggregate and compute an average computing load for a tier every five minutes. Analysis subsystem 244 requests the aggregated data based on the registered names. In some embodiments, analysis subsystem 244 may define calculations directly and pass them to sensor subsystem 240 dynamically.

Analysis subsystem 244 is composed of a plurality of forward chaining rule engines 246A-246N. In general, rule engines 246 match patterns in a combination of configuration data and monitoring data, which is presented by extraction agent 251 in the form of events. Events contain the aggregated data values that are sent to rule engines 246 in accordance with scheduler 242.

Sensor subsystem 240 may interact with analysis subsystem 244 via trigger listeners 247 that receives updates from a trigger within sensor subsystem 240 when specified events occur. An event may be based on system state (e.g., a node transitioning to an up or down state) or may be time based.

Analysis subsystem 244 allows rule sets to be loaded in source form and compiled at load time into discrimination networks. Each rule set specifies trigger-delivered attributes. Upon loading the rule sets, analysis subsystem 244 establishes trigger listeners 247 to receive sensor notifications and update respective working memories of rule engines 246. As illustrated in FIG. 17, each of rule engines 246 may serve a different tier defined within the fabric. Alternatively, multiple rule engines 246 may serve a single tier or a single rule engine may serve multiple tiers.

Rule engines 246 process the events and invoke action requests via calls to effector subsystem 248. In addition, rule engines 246 provide a call-back interface so that effector subsystem 248 can inform a rule engine when an action has completed. Rule engines 246 prevent a particular rule from re-firing as long as any action invoked by the rule has not finished. In general, rules contain notification calls and service invocations though either may be disabled by configuration of effector subsystem 248. BLT 206 supplies initial system configuration descriptions to seed each of rule engines 246.

In general, rule engines 246 analyze the events and discover discrepancies between an expected state of the fabric and an actual state. Each of rule engines 246 may be viewed as software that performs logical reasoning using knowledge encoded in high-level condition-action rules. Each of rule engines 246 applies automated reasoning that works forward from preconditions to goals defined by system administrator 20. For example, rule engines 246 may apply modus ponens inferences rules.

Rule engines 246 output requests to effector subsystem 248 which produce actions requests 212 for BLT 206 to resolve the discrepancies. Effector subsystem 248 performs all operations on behalf of analysis subsystem 244. For example, event generator 250, task invocation module 252 and logger 254 of effector subsystem 248 perform event generation, BLT action invocation and rule logging, respectively. More specifically, task invocation module 252 invokes asynchronous operations within BLT 206. In response, BLT 206 creates a new thread of control for each task which is tracked by a unique task identifier (task id). Rules engine 246 uses the task id to determine when a task completes and, if needed, to re-fire any rules that were pended until completion of the task. These tasks may take arbitrary amounts of time, and rules engine 246 tracks the progress of individual task via change notifications 211 produced by BLT 206.

Event generator 250 creates persistent event records of the state of processing of SLAI 204 and stores the event records within a database. Clients uses these event records to track progress and determine the current state of the SLAI 204.

Logger 254 generates detailed trace information about system activities for use in rule development and debugging. The logging level can be raised or lowered as needed without changing operation of SLAI 204.

Figure 18:
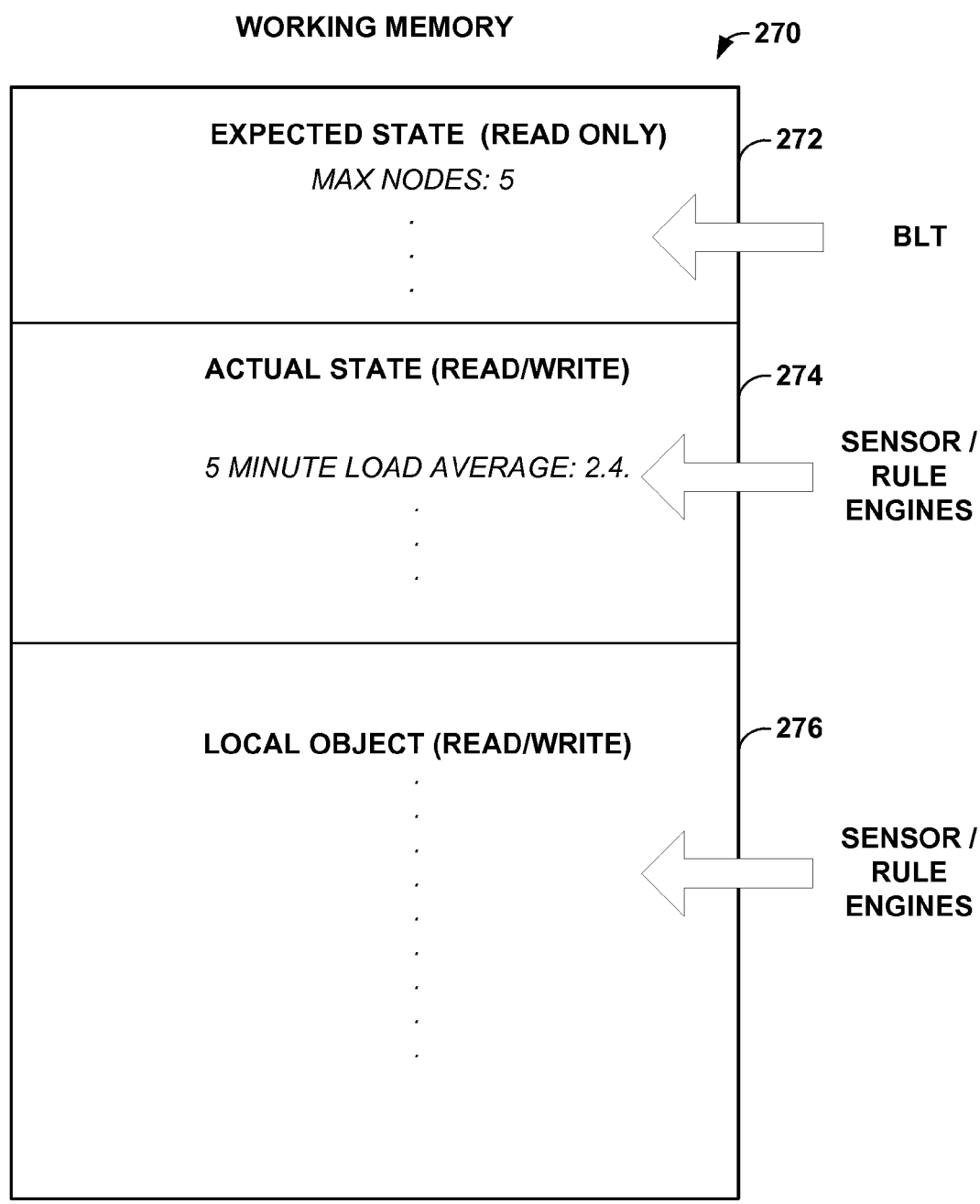
FIG. 18 is a block diagram of an example working memory associated with rule engines of the SLAI.

FIG. 18 is a block diagram of an example working memory 270 associated with rule engines 246. In this example, working memory 270 includes a read-only first data region 272 that stores the expected state received from BLT 206. Data region 272 is read-only in the sense that it cannot be modified in response to a trigger from sensor subsystem 240 or by rule engines 246 without notification from BLT 206.

In addition, working memory 270 includes a second data region 274 that is modifiable (i.e., read/write) and may be updated by monitoring subsystem 202 or used internally by rule engines 246. In general, data region 274 stores aggregated data representing the actual state of the fabric and can be updated by sensor subsystem 240 or by rule engines 246. The actual state may consist of a set of property annotations that can be attached to objects received from BLT 206 or to objects locally defined within a rule engine, such as local object 276.

Figure 19:
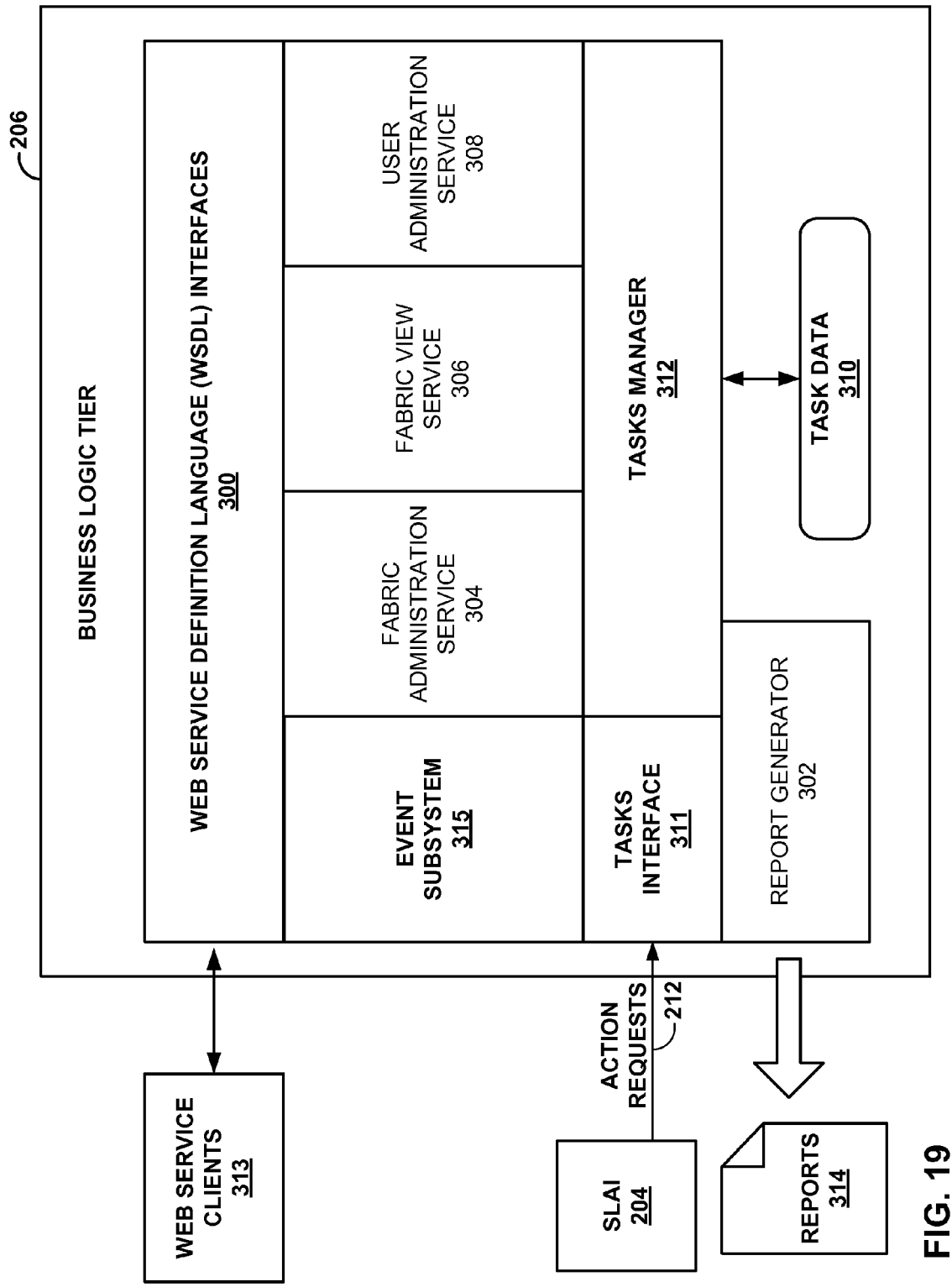
FIG. 19 is a block diagram illustrating an example embodiment for the BLT of the control node.

FIG. 19 is a block diagram illustrating an example embodiment for BLT 206. In this example, BLT 206 includes a set of one or more web service definition language (WSDL) interfaces 300, a report generator 302, a fabric administration interface service 304, a fabric view service 306, a user administration service 308, a task interface 311, a task manager 312 and an event subsystem 315.

As described, BLT 206 provides the facilities necessary to create and administer the organizational model (e.g., fabric, domains, tiers and nodes) implemented by distributed computing system 10. In general, BLT 206 abstracts access to the persisted configuration state of the fabric, and controls the interactions with interfaces to fabric hardware services. As such, BLT 206 provides fabric management capabilities, such as the ability to create a tier and replace a failed node. WSDL interfaces 300 provide web service interfaces to the functionality of BLT 206 that may be invoked by web service clients 313. Many of WSDL interfaces 300 offered by BLT 206 allow administrator 20 to define goals, such as specifying a goal of the expected state of the fabric. As further described below, rule engines 246 within SLAI 204, in turn, invoke task manger 312 to initiate one or more BLT tasks to achieve the specified goal. In general, web service clients 313 may be presentation layer applications, command line applications, or other clients.

BLT 206 abstracts all interaction with physical hardware for web service clients 313. BLT 206 is an enabling component for autonomic management behavior, but does not respond to real-time events that either prevent a goal from being achieved or produce a set of deviations between the expected state and the actual state of the system. In contrast, BLT 206 originates goals for autonomic reactions to changing configuration and state. SLAI 204 analyzes and acts upon these goals along with real-time state changes. BLT 206 sets the goals to which SLAI 204 strives to achieve, and provides functionality used by the SLAI in order to achieve the goals.

In general, BLT 206 does not dictate the steps taken in pursuit of a goal since these are likely to change based on the current state of distributed computing system 10 and changes to configurable policy. SLAI 204 makes these decisions based on the configured rule sets for the fabric and by evaluating monitoring data received from monitoring subsystem 202.

Fabric administration service 304 implements a set of methods for managing all aspects of the fabric. Example methods include methods for adding, viewing, updating and removing domains, tiers, nodes, notifications, assets, applications, software images, connectors, and monitors. Other example methods include controlling power at a node, and cloning, capturing, importing, exporting or upgrading software images. Rule engines 246 of SLAI 204 may, for example, invoke these methods by issuing action requests 212.

Task manager 312 receives action requests 212 via task interface 311. In general, task interface 311 provides an interface for receiving action requests 212 from SLAI 204 or other internal subsystem. In response, task manager 312 manages asynchronous and long running actions that are invoked by SLAI 204 to satisfy a goal or perform an action requested by a client.

Task manager 312 generates task data 310 that represents identification and status for each task. Task manager 312 returns a task identifier to the calling web service clients 313 or the internal subsystem, e.g., SLAI 204, that initiated the task. Rule engines 246 and web service clients 313 use the task identifiers to track progress and retrieve output, results, and errors associated with achieving the goal.

In one embodiment, there are no WSDL interfaces 300 for initiating specific tasks. Rather, administrator 20 interacts with BLT 206 though goal interfaces presented by WSDL interfaces 300 to define the goals for the fabric. In contrast, the term task is used to refer to internal system constructs that require no user interaction. Tasks are distinct, low-level units of work that affect the state of the fabric. SLAI 204 may combine tasks to achieve or maintain a goal state.

For example, administrator 20 can request configuration changes by either adding new goals to an object or by modifying the attributes on existing goals. Scheduled goals apply a configuration at a designated time. For example, the goals for a particular tier may specify the minimum, maximum, and target node counts for that tier. As a result, the tier can increase or decrease current node capacity by scheduling goals with different configuration values.

This may be useful, for example, in scheduling a software image upgrade. As another example, entire domains may transition online and offline per a defined grid schedule. Administrator 20 may mix and match goals on a component to achieve configurations specific to the application and environment. For example, a tier that does not support autonomic node replacement would not be configured with a harvesting goal.

In some embodiments, goals are either "in force" or "out of force." SLAI 204 only works to achieve and maintain those goals that are currently in force. SLAI 204 may applies a concept of "gravity" as the goals transition from in force to out of force. For example, SLAI 204 may transition a tier offline when an online goal is marked out of force. Some goal types may have prerequisite goals. For example, an image upgrade goal may require as a prerequisite that a tier be transitioned to offline before the image upgrade can be performed. In other embodiments, goals are always in force until modified.

SLAI 204 may automatically formulate dependencies between goals or may allow a user to specify the dependencies. For example, a user may request that a newly created tier come online. As a result of this goal, SLAI 204 may automatically direct task manager 312 to generate a task of harvesting a target number of nodes to enable the tier. Generally, all goals remain in-force by SLAI 204 until modified by BLT 206. In one embodiment, each goal remains in-force in one of three states: Satisfied, Warning, or Critical depending on how successful SLAI 204 was in achieving the goal at the time the event record was generated and stored.

In this manner, SLAI 204 controls the life cycle of a goal (i.e., the creation, scheduling, update, deletion of the goal), and provides a common implementation of these and other services such as timeout, event writing, goal conflicts, management of intra-goal dependencies, and tracking tasks to achieving the goals.

Progress toward a goal is tracked though event subsystem 315. In particular, event subsystem 315 tracks the progress of each in force goal based on the goal identifiers. Tasks executed to achieve a particular goal produce events to communicate result or errors. The events provide a convenient time-based view of all actions and behaviors.

Examples of goal types that may be defined by administrator 20 include software image management goals, node allocation goals, harvest goals, tier capacity goals, asset requirement goals, tier online/offline goals, and data gathering goals.

In one embodiment, BLT 206 presents a task interface to SLAI 204 for the creation and management of specific tasks in order to achieve the currently in force goals. In particular, rule engines 246 invoke the task interface based on evaluation of the defined rule sets in view of the expected state and actual state for the fabric. Example task interfaces include interfaces to: reserve node resources; query resources for a node slot; associate or disassociate an image with a node in a tier node slot; allocate, de-allocate, startup or shutdown a node; move a node to a tier; apply, remove or cycle power of a node; create a golden image; create or delete an image instance; and delete an activity, node or tier.

Report generator 302 provides an extensible mechanism for generating reports 314. Typical reports include image utilization reports that contain information with respect to the number of nodes running each software image, inventory reports detailing both the logical and physical aspects of the fabric, and system event reports showing all events that have occurred within the fabric. Report generator 302 gathers, localizes, formats and displays data into report form for presentation to the user. Report generator 302 may include one or more data gathering modules (not shown) that gather events in accordance with a schedule and update an events table to record the events. The data gathering modules may write the events in XML format.

Figure 20:
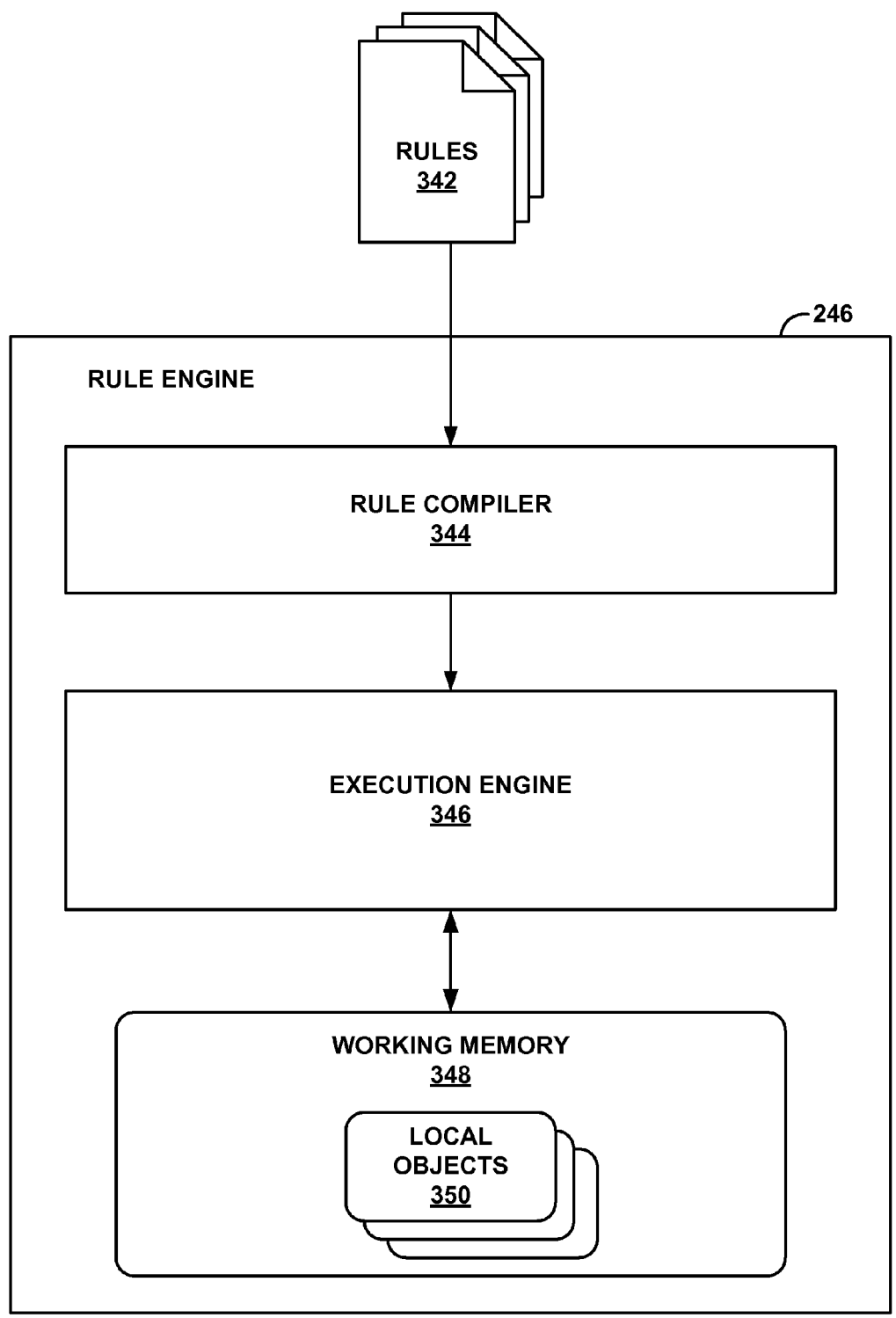
FIG. 20 is a block diagram illustrating one embodiment of a rule engine in further detail.

FIG. 20 is a block diagram illustrating one embodiment of a rule engine 246 (FIG. 17). In the illustrated embodiment, rule engine 246 includes a rule compiler 344 and an execution engine 346. Each of rules 342 represents a unit of code that conforms to a rule language and expresses a set of triggering conditions and a set of implied actions. When the conditions are met, the actions are eligible to occur. The following is one example of a configuration rule:

```
rule checkTierLoad {
    Tier t where status != "overloaded";
    LoadParameter p where app == t.app && maxload < t.load;
} -> {
    modify t {
        status: "overloaded";
    };
}
```

When translated, this example rule marks a tier as overloaded if an application is implemented by the tier and the maximum specified load for the application has been exceeded. Another example rule for outputting a notification that a tier is overloaded and automatically invoking a task within BLT 206 to add a node is:

```
rule tierOverloadNotify {
    Tier t where status == "overloaded";
} -> {
    notify "Tier: " + t + "is overloaded.";
    BLT.addNode(f);
}
```

Rule compiler 344 compiles each of rules 344 and translates match conditions of the rules into a discrimination network that avoids redundant tests during rule execution. Execution engine 346 handles rule administration, object insertion and retrieval, rule invocation and execution of rule actions. In general, execution engine 346 first matches a current set of rules 342 against a current state of working memory 348 and local objects 350. Execution engine 346 then collects all rules that match as well as the matched objects and selects a particular rule instantiation to fire. Next, execution engine 346 fires (executes) the instantiated rule and propagates any changes to working memory 348. Execution engine 346 repeats the process until no more matching rule instantiations can be found.

Firing of a rule typically produces a very small number of changes to working memory 348. This allows sophisticated rule engines to scale by retaining match state between cycles. Only the rules and rule instantiations affected by changes are updated, thereby avoiding the bulk of the matching process. One exemplary algorithm that may be used by execution engine 346 to handle the matching process includes the RETE algorithm that creates a decision tree that combines the patterns in all the rules and is intended to improve the speed of forward-chained rule system by limiting the effort required to re-compute a conflict set after a rule is fired. One example of a RETE algorithm is described in Forgy, C. L.: 1982, 'RETE: a fast algorithm for the many pattern/many object pattern match problem', Artificial Intelligence 19, 1737, hereby incorporated by reference. Other alternatives include the TREAT algorithms, and LEAPS algorithm, as described by Miranker, D. P.: 'TREAT: A New and Efficient Match Algorithm for AI Production Systems'. ISBN 0934613710 Daniel P. Miranker, David A. Brant, Bernie Lofaso, David Gadbois: On the Performance of Lazy Matching in Production Systems. AAAI 1990: 685692, each of which is hereby incorporated by reference.

Figure 21:
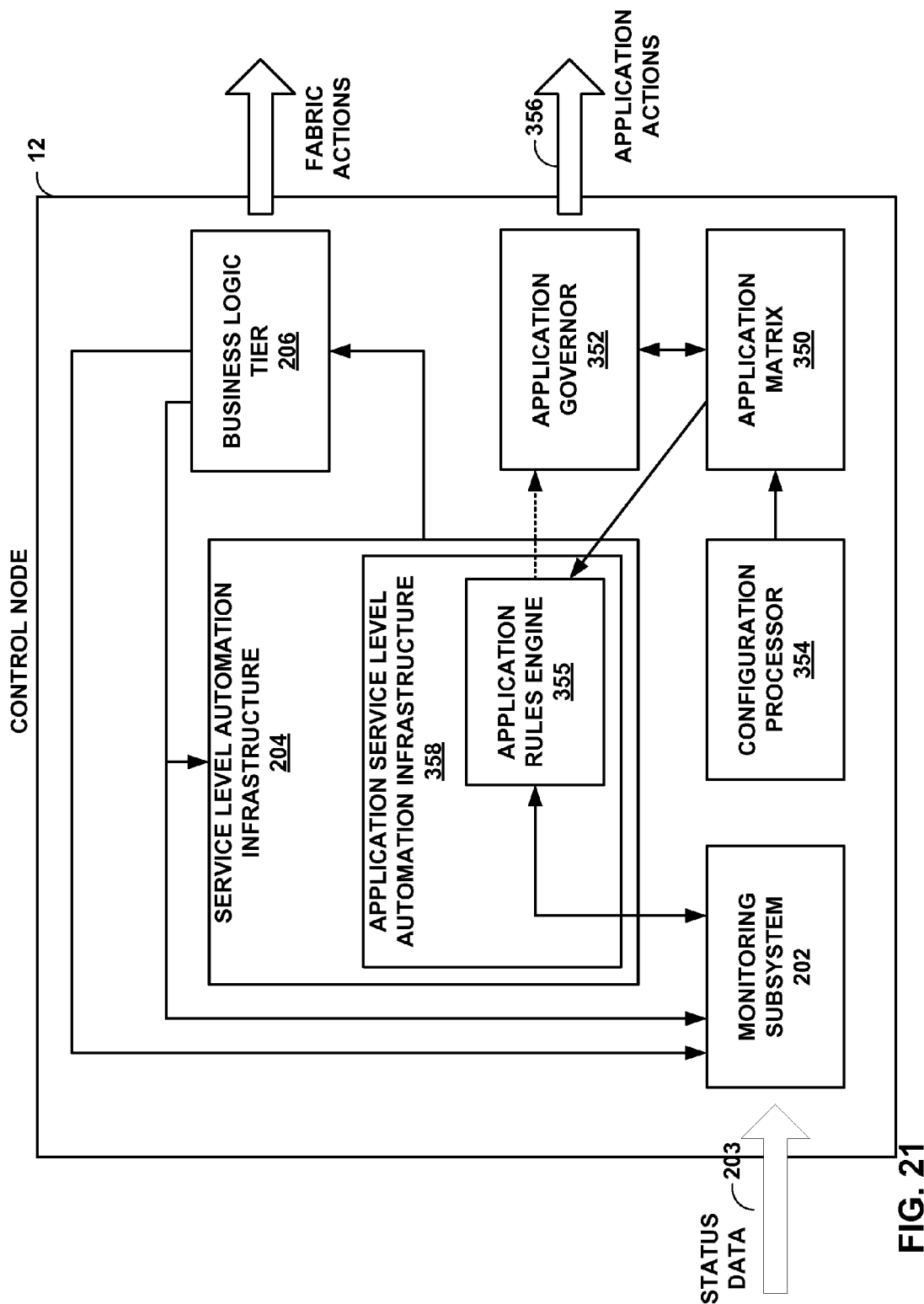
FIG. 21 is a block diagram illustrating another example embodiment of the control node.

FIG. 21 is a block diagram illustrating an alternative embodiment of control unit 12 (FIG. 15). In this embodiment, control unit 12 operates substantially as described above, but includes an application matrix 350, an application governor 352, a configuration processor 354, and an application service level automation infrastructure ("application SLAI") 358. As described below, application matrix 350, application governor 352, configuration processor 354, and application SLAI 358 provide a framework that allows control unit 12 to autonomically control the deployment, execution and monitoring of applications across application nodes 14 of distributed computing system 10.

Application matrix 350 contains all the information needed by control unit 12 to interact with one or more applications or application servers and provide autonomic control over a set of applications. Specifically, application matrix 350 provides a logical definition for deploying and controlling the set of applications to one or more tiers within distributed computing system 10. In one embodiment, application matrix 350 is an electronic document that conforms to a data description language, e.g., the extensible markup language (XML). Application SLAI 358 includes an application rules engine 355 dedicated to processing application-level rules, i.e., forward-chaining rules to provide autonomic control over the applications defined within application matrix 350. Like rules engine 246, application rules engine 355 contains a rule compiler, an execution engine, and a working memory. In order to give effect to changes in application matrix 350, application SLAI 358 automatically updates application rules engine 355 and monitoring subsystem 202. In particular, application matrix 350 sends an alert whenever application matrix 350 changes. In response to this alert, application SLAI 358 captures application-specific attributes from application matrix 350. Specifically, application SLAI 358 captures configuration attributes and rule attributes contained in application matrix 350. Application SLAI 358 transfers any new rule attributes to the working memory of application rules engine 355 to provide autonomic control over the deployment, monitoring and the execution of the applications defined within application matrix 350. In addition, application SLAI 358 updates monitoring subsystem 202 to collect information required to control the applications In this manner, administrator 20 may continue to add new application definitions and configurations to application matrix 350 after distributed control node 12 has started.

As described in further detail below, configuration processor 354 is a software module that generates an application matrix entry based on an application definition and application configuration properties of a "staged" application. A staged application is an application that has been deployed in a staging environment and customized for subsequent deployment within distributed computing system 10. After creating the application matrix entry, administrator 20 may insert the application matrix entry into application matrix 350.

Configuration processor 354 is "pluggable." That is, administrator 20 can "plug in" different implementations of configuration processor 354 as needed. For example, administrator 20 may need to "plug in" a different implementation of configuration processor 354 to handle applications that do not use an application server.

Application governor 352 is a software engine that performs application-level actions based on requests received from application rules engine 355. In this manner, BLT 206 effects fabric-level actions (e.g., deployment and monitoring of nodes and images) based on request from fabric-level rules engines 246 (FIG. 17), while matrix governor 352 performs application-level actions (e.g., deployment and monitoring of applications) based on requests from application rules engine 355.

Application governor 352 uses application matrix 350 as a source of parameters when carrying out the application-level operations requested by application rules engine 355. For example, application rules engine 355 may detect that a node to which the application is not deployed is ready for use by the application. As a result, application rules engine 355 directs application governor 352 to handle the details of deploying the application to the node. In turn, application governor 352 accesses application matrix 350 to retrieve application-specific parameters necessary to deploy the application. Storing application-specific parameters in application matrix 350 allows the application-specific parameters to change without having to recompile the rules within working memory of application rules engine 355.

Application governor 352 performs a similar procedure to undeploy an application. That is, application rules engine 355 may detect that a second application needs to use a node more than a first application that is currently deployed to the node. In this situation, application rules engine 355 sends an instruction to application governor 352 to undeploy the first application and deploy the second application. To carry out this instruction, application governor 352 accesses application matrix 350 to discover configuration parameters of both applications. Application governor 352 then uses the discovered configuration parameters to communicate with the applications.

Like configuration processor 354, application governor 352 is also "pluggable." That is, administrator 20 can easily install or remove implementations of application governor 352 depending on the circumstances. Because application governor 352, and configuration processor 354 represent interchangeable, plug-in modules, the other parts of control unit 12 and system 10, including application rules engine 355, can remain generic and application neutral while providing autonomic control over distributed computing system 10.

FIG. 22 provides a conceptual view of an exemplary application matrix 350. Although application matrix 350 is typically represented in an encoded, electronic document (e.g., an XML document), FIG. 22 provides a conceptual view for ease of illustration.

In this example, application matrix 350 contains seven columns and two rows. Each row represents a different application entry for deployment within distributed computing system 10. In FIG. 22, only the first entry is shown in detail.

Each of the columns represents a different category of elements that make up an application's logical definition. In this example, the columns include:

(1) an application column 360 that includes elements generally related to the deployment of the application, (2) an application nodes column 362 that contains elements related to the tier node slots to which the application may be assigned, (3) a services column 364 that contains elements related to the executable services launched when the application is deployed, (4) a node monitor values column 366 that contains elements related to attributes of the nodes that are to be monitored after the application is deployed to that node, (5) a service monitored attributes column 368 that contains elements related to attributes of the services that are to be monitored after the application is deployed, (6) a service levels column 370 that contains elements related to attributes for use when constructing rules to monitor execution of the services, and (7) a deployment constraints column 372 that contains elements related to attributes for use when constructing rules to control deployment of the application.

Different types of applications may have different elements in each column, and different numbers of columns.

In the example of FIG. 22, application matrix 350 contains two applications 360 "DataDomain" 374 and "PortalDomain" 376. DataDomain application 374 has eleven attributes that define how control node 12 accesses and launches the application. For instance, the "adminIP" and "adminPort" attributes instruct governor 352 as to which the server and port hosts the administrative part of the logically defined application. Other attributes like "maxNodes" and "minNodes" instruct application rules engine 355 to run the application no less than minNodes and no more than maxNodes. Applications other than application 374 may have different numbers or types of attributes. In XML format, the attributes of application 374 may appear as follows:

```
<WebServerDomain
    name="DataDomain"
    adminIP="172.31.64.201"
    adminPort="1100"
    adminTier="Web Admin"
    clusterName="PathCluster"
    expectedStartupDelay="120"
    loadDelay="120"
    maxNodes="2"
    minNodes="1"
    nodeManagerPort="5811"
    nodeTier="Web App"
>
```

In addition to these attributes, application 374 contains a series of elements (columns 362-372). In general, application nodes 362 contain a list of all of the available tier-node slots to which control node 12 may deploy application 374. In this example, two tier-node slots are specified. In XML, managed servers 362 appears as:

```
<ManagedServers IP="172.31.64.201" name="managedServer_0" state="STOPPED" />
<ManagedServers IP="172.31.64.201" name="managedServer_1" state="STOPPED" />
```

Each services 364 element identifies a service that control node 12 launches when deploying application 374 on a given application node. A service element comprises a service name and a path to a file containing the executable service. Governor 352 uses the path to locate and launch the service. For example, the following XML code indicates that governor 352 must access the file at "/lib/worklistApp/worklistApp.ear".

```
<services name="Worklist User Interface"
    path="/lib/worklistApp/worklistApp.ear" />
```

Node Monitored Values 366 elements represent characteristics for use in constructing rules for monitoring nodes to which the applications are deployed. Similarly, Service Monitored Values 368 elements represent characteristics for use in constructing rules for monitoring services that are launched once the application is deployed. In this example, a "nodeMonitoredValues" element defines characteristics of a particular node that are to be monitored. For instance, the amount of free memory in a node is one example of a characteristic listed as a "nodeMonitoredValues" element. On the other hand, a "serviceMonitoredValues" element is specific attribute of a service that is to be monitored. For example, the number of pending operating system-level requests for the service, the number of idle threads, etc., could be service monitored values. In a XML rendition of application matrix 350, node monitored values and service monitored values could appear as follows:

```
<nodeMonitoredValues name="Load5Average" />
<nodeMonitoredValues name="PercentMemoryFree" />
<serviceMonitoredValues name="PendingRequests" />
<serviceMonitoredValues name="ExecuteThreadIdleCount" />
<serviceMonitoredValues name="ExecuteThreadTotalCount" />
```

Deployment constraint elements 372 specify characteristics of a node under which application rules engine 355 should (or should not) deploy a service to the node. In this example, a deployment constraint element has five attributes: "attribute", "expression", "frequency", "maxThreshold", "minThreshold", and "period." The "attribute" attribute names the deployment constraint. The "expression" attribute specifies an arithmetic expression manipulating a monitored value. For example, the expression could be "PercentMemoryFree*100", meaning monitor the value of the "PercentMemoryFree" node monitored value multiplied by 100. The "expression" attribute may specify one or more node monitored values. The "frequency" attribute informs application rules engine 355 how frequently to check the monitored value. The "maxThreshold" attribute tells application rules engine 355 to invoke a rule when the value of the expression exceeds the value specified by the "maxThreshold" attribute. Similarly, the "minThreshold" attribute tells application rules engine 355 to invoke the rule when the value of the expression drops below the value specified by the "minThreshold" attribute. Finally, the "period" attribute informs application rules engine 355 of the period over which to collect monitored value. For example, a deployment constraint element may specify that application rules engine 355 should monitor the PercentMemoryFree attribute of a node every 15 seconds for 60 seconds. If the value of PercentMemoryFree*100 should drop below 1.0 (i.e. 1% of memory free) for 60 seconds, then application rules engine 355 should not deploy the application to that node. In XML, this rule would be represented as:

```
<deploymentConstraints attribute="FreeMemory"
expression="PercentMemoryFree*100" frequency="15" maxThreshold="-1.0" minThreshold="1.0" period="60" />
```

Service level elements 370 have the same five attributes as deployment constraints elements: "attribute", "expression", "frequency", "maxThreshold", "minThreshold", and "period". However, the "expression" attribute deals with service monitored attributes rather than node monitored attributes. For example, a service level element may specify that application rules engine 355 check the "pendingRequest" service-monitored attribute every 15 seconds for 30 seconds. Then, if there are more than 20 pending requests for more than 30 seconds, application rules engine 355 should take the action of starting a new application. On the other hand, if there are fewer than 5 pending requests for 30 seconds, application rules engine 355 enables the action to remove the application to free up space on a node. Such a service level element could be represented as:

```
<serviceLevels attribute="PendingRequests"
expression="PendingRequests" frequency="15" maxThreshold="20.0"
minThreshold="5.0" period="30" />
```

Put together, an XML representation of an application matrix logically defining a single application for deployment within autonomically controlled distributed computing system 10 may appear as follows:

```
<?xml version="1.0" encoding="UTF-8" standalone="yes" ?>
<appMatrixRegister>
<WebServerDomain adminIP="172.31.64.201" adminPort="1100"
adminTier="Web
Admin" clusterName="PathCluster" expectedStartupDelay="120"
loadDelay="120" maxNodes="2" minNodes="1" name="DataDomain"
nodeManagerPort="5811" nodeTier="Web App">
    <ManagedServers IP="172.31.64.201" name="managedServer_0"
    state="STOPPED" />
    <ManagedServers IP="172.31.64.201" name="managedServer_1"
    state="STOPPED" />
    <applications name="AI Design-time"
    path="/lib/ai-designtime.ear" />
    <applications name="System EJBs" path="/lib/ejbs.ear" />
    <applications name="Worklist Worker User Interface"
    path="/lib/worklist/worklist.ear" />
    <applications name="DBMS_ADK" path="/lib/DBMS_ADK.ear"
    />
    <applications name="UserApp"
    path="/user_projects/domains/userApp.ear"
    />
    <nodeMonitoredValues name="Load5Average" />
    <nodeMonitoredValues name="PercentMemoryFree" />
    <serviceMonitoredValues name="PendingRequests" />
    <serviceMonitoredValues name="ExecuteThreadIdleCount" />
    <serviceMonitoredValues name="ExecuteThreadTotalCount" />
    <deploymentConstraints attribute="LoadAverage"
    expression="Load5Average" frequency="15"
    maxThreshold="4.0"
    minThreshold="-1.0" period="15" />
    <deploymentConstraints attribute="FreeMemory"
    expression="PercentMemoryFree*100" frequency="15"
    maxThreshold="-1.0"
    minThreshold="1.0" period="60" />
    <serviceLevels attribute="BusyThreadPercentage"
    expression="(ExecuteThreadTotalCount-
    ExecuteThreadIdleCount) *100/ExecuteThreadTotalCount"
    frequency="15"
    maxThreshold="20.0" minThreshold="5.0" period="30" />
    <serviceLevels attribute="PendingRequests"
    expression="PendingRequests" frequency="15"
    maxThreshold="20.0"
    minThreshold="5.0" period="30" />
</WebserverDomain>
</appMatrixRegister>
```

Figure 23:
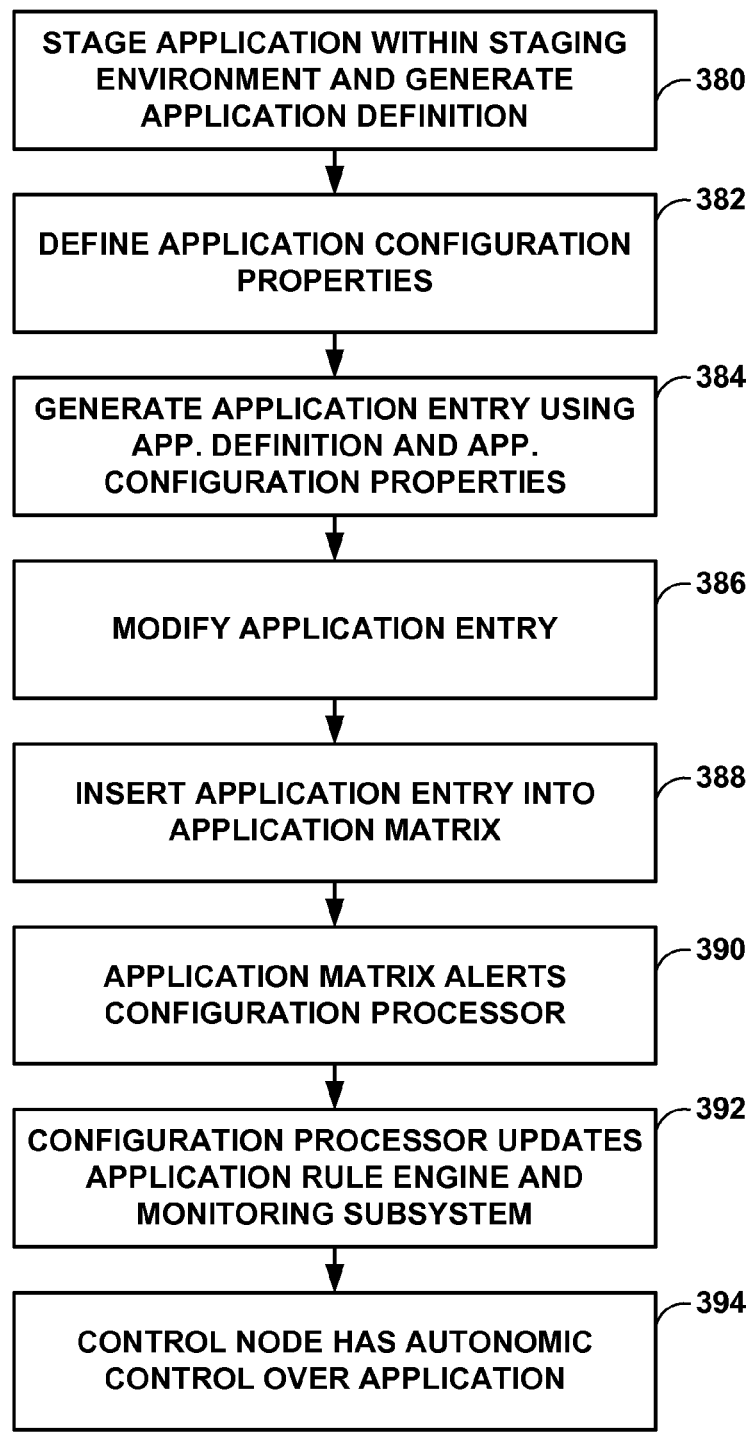
FIG. 23 is a block diagram illustrating an exemplary application matrix.

FIG. 23 is a flowchart illustrating an exemplary series of general steps that are performed to add an application to application matrix 350 in accordance with the principles of this invention. Administrator 20 first stages the application within a staging environment including deploying the application on a desired image, creating a domain, specifying any services and external system connectivity (e.g., connections to databases, queues) (380).

During this process, administrator 20 directs the application to generate an application definition file that represents an application-specific configuration based on the environment specified by the administrator. The application definition file contains information specific to an installation instance of the application. For example, the application definition file typically specifies the locations (paths) for all software components of the application as staged within the staging environment, a list of files to execute, connectivity information for the application, and other information that may be recorded by the configured application.

After staging the application, administrator 20 defines a set of application configuration properties that specify desired behavior of the application within distributed computing system 10 (382). Examples of such application configuration properties include a minimum number of nodes, minimum resource requirements for a node, deployment timing information, network addresses of tier node slots that are able to execute the application and other properties.

Next, administrator 20 directs configuration processor 354 to generate an application entry for the application using the application definition and the application configuration properties (384). The application entry contains configuration attributes used by application governor 352 to interact with the application. In addition, the application entry contains rule attributes used by application rules engine 355 that define how control node 12 monitors the deployment and execution of the application within distributed computing environment 10.

After configuration processor 354 creates the application entry, administrator 20 may modify the application entry (386). In particular, administrator 20 may update start scripts or shell scripts for the application due to path changes between the staging environment and distributed computing system 10.

Once administrator 20 has finished modifying the application entry, administrator 20 inserts the application entry into application matrix 350 (388). Because application matrix 350 detects that it has changed, application matrix 350 sends an alert to application SLAI 358 (390).

In response to the alert, application SLAI 358 may update application rules engine 355 and monitoring subsystem 202 (392). In particular, application SLAI 358 automatically scans application matrix 350. If application SLAI 358 detects new rule attributes, application SLAI 358 creates local objects reflecting the new rule attributes in the working memory of application rules engine 355. In addition, if application SLAI 358 detects new monitored values, application SLAI 358 updates monitoring subsystem 202 to add new monitoring collectors 224 (FIG. 16).

After application SLAI 358 updates application rules engine 355 and monitoring subsystem 202, control node 12 has autonomic control over the deployment of applications to tiers based on the configuration of application matrix 350 (394). For example, control node 12 deploys images, deploys applications, monitors the state of nodes and the execution of the applications, and applies tier-level rules as well as application-specific rules. Application SLAI 358 continues to listen for alerts from application matrix 350.

Figure 24:
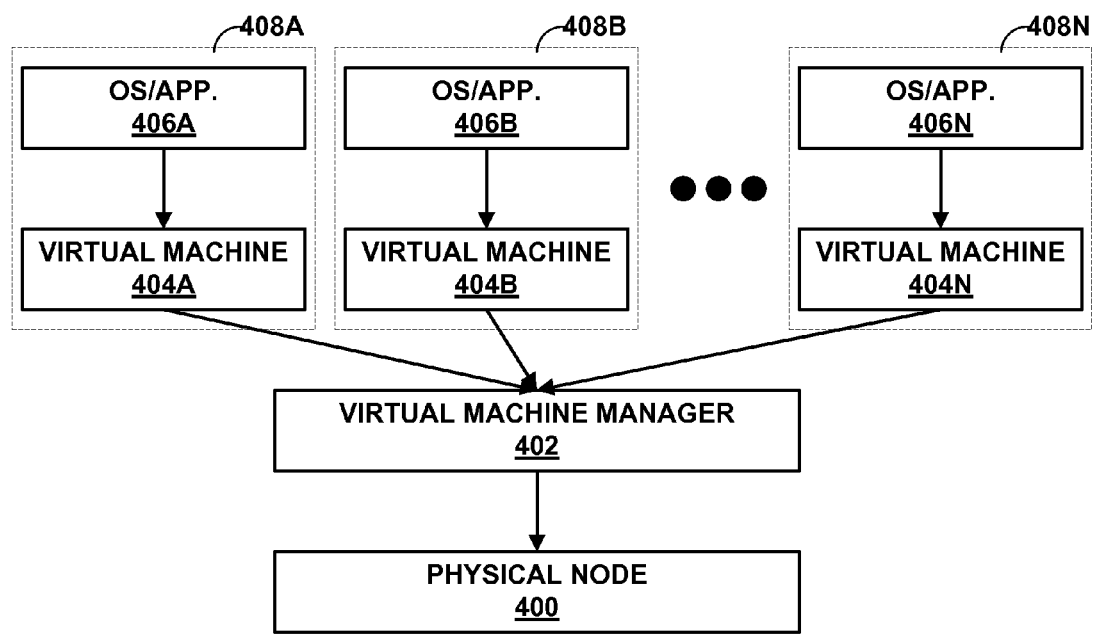
FIG. 24 is a block diagram illustrating an exemplary configuration of a physical node to which a virtual machine manager and one or more virtual machines are deployed.

FIGS. 24 through 29 illustrate exemplary embodiments of distributed computing system 10 that provides autonomic control and deployment of virtual machines and virtual disk image files. For example, FIG. 24 is a block diagram illustrating an exemplary configuration of a physical node 400. Node 400 may be any node within distributed computing system 10 (FIG. 1). For instance, node 400 may be any one of application nodes 14.

As illustrated in FIG. 24, a virtual machine manager 402 is executing on node 400. As used herein, a virtual machine manager is a software program that is capable of managing one or more virtual machines. For example, virtual machine manager 402 may be an instance of VMWare ESX software produced by VMWare, Inc. of Palo Alto, Calif.

When deployed on physical node 200, virtual machine manager 402 hosts virtual machines 404A through 404N (collectively, virtual machines 404). The term virtual machine is used herein to refer to software that creates an environment that emulates a computer platform. For example, virtual machines 40 provide environments on which guest operating systems (OS) execute as through the operating systems were operating directly on a physical computing platform. In this manner, multiple operating systems and software applications 406A through 406N (collectively, operating systems and applications 406) may execute on virtual machines 404A through 404N, respectively, and the virtual machines 404 may execute on a single physical node 400 or multiple physical nodes. For example, if virtual machine 404A emulates an x86 machine, an instance of the Microsoft Windows operating system (e.g., OS 406A) may execute on virtual machine 404A as through the instance of Windows were running on a physical x86 machine. Other software applications may be installed and configured on the guest operating system running on virtual machine 404. For example, an instance of Microsoft Internet Information Server may execute on an instance of Microsoft Windows that is executing on a virtual machine that emulates an x86 machine. In this manner, virtual machine manager 402 and virtual machines 404 provide a level of independence from the particular hardware environment provided by physical node 400.

Virtual machine manager 402 utilizes operating system data and application data for execution of each of virtual machines 404. The operating system data and application data, as well as instance-specific configuration data for the underlying virtual machines 404, is stored as respective virtual disk image files 408. From the perspective of the guest operating system, each of virtual disk image files 408 appears as a bootable hard disk of the host computer. In other words, the virtual disk image file provides a bootable software image of the operating system and applications, and includes all necessary configuration data and file structures. As illustrated in FIG. 24, virtual machine disk image file 408A provides a bootable software image for operating system/application information 406A that is capable of being executed on virtual machine 404A. For instance, if virtual machine manager 402 is an instance of VMWare ESX, virtual machine disk image files 408 may be specially captured .vmdk files.

A two-phase capture process may be used to provide autonomic control and deployment of the virtual machine disk image files 408 as well as virtual machine manager 402 to physical nodes within distributed computing system 10. In particular, control node 12 may first capture an image of virtual machine manager 402 installed on physical node 400 prior to installation and configuration of any guest operating system and applications 406. Control node 12 may utilize this captured image of virtual machine manager 402 as a "golden image" from which instance images can be created for this type virtual machine. The instance images may be stored within application matrix 350 for autonomic deployment as other software images (FIG. 21).

After the first capture is complete, an administrator may install one or more virtual machines 404 to virtual machine manager 402. After the user installs and configures guest operating systems and any necessary applications 406 on the virtual machines 404, control node 12 may capture software images for storage as virtual disk image files 408. Specifically, control node 12 may utilize the captured images as a golden images for the particular operating systems, applications and specific configuration of the virtual machine. The golden image may then be used to produce image instances, i.e., virtual disk images in this case, that are bootable on the virtual machines. The image instances may likewise be stored in application matrix 350 for autonomic deployment.

After generation of image instances for virtual machine manager 402 and virtual disk image files 408, control node 12 may deploy the image instance of virtual machine manager 402 to one or more nodes in free pool 13. Once control node 12 deploys the image instance of virtual machine manager 402 to a node, the node appears to be one or more new, unallocated nodes. For instance, if the image instance of virtual machine manager 402 is configured to support five virtual machines, control node 12 represents the newly deployed image instance as though five new, unallocated nodes have been added to free pool 13. Subsequently, control node 12 may deploy an image instance of virtual disk image files 408 to one of the new unallocated nodes.

In one embodiment, during deployment, administrator 20 may specify whether data in virtual disk image files is to be treated as persistent or non-persistent. If administrator 20 specifies that the virtual disk image files are persistent, changes made to a virtual disk image file persist when node is restarted. To ensure the persistence of the data, administrator 20 may configure virtual machine manager 402 to store virtual disk image files in a storage area network (SAN). Otherwise, if administrator 20 specifies that virtual disk image files are non-persistent, the original virtual disk image file is reloaded from control node 12. Non-persistence may be valuable to minimize risks (e.g., potential corruption due to viruses) associated with prolonged use of an operating system. Further, corrupt or invalid data in the virtual disk image file may be corrected by use of non-persistent image instances for the virtual disk image files.

In this way, distributed computing system 10 may autonomically utilize application nodes, e.g, node 400, to flexibly support a wide variety of operating systems and applications, and provide virtualized execution environment for those operating systems and applications. For instance, node 400 may autonomically configured to support a Macintosh Operating System designed for a PowerPC processor, and a Microsoft Windows Operating System designed for an x86 processor based on the particular goals of the autonomic system. Thus, control node 12 may not need to distinguish between hardware processor architectures when deploying operating systems and applications. However, this system may also allow administrator 20 to specify that control node 12 operate an image instance directly on a node without the intervening virtual machine and virtual machine manager. Furthermore, by executing multiple operating systems on a single node, distributed computing system 10 may be able to use and deploy the resources of each node more efficiently.

Figure 25:
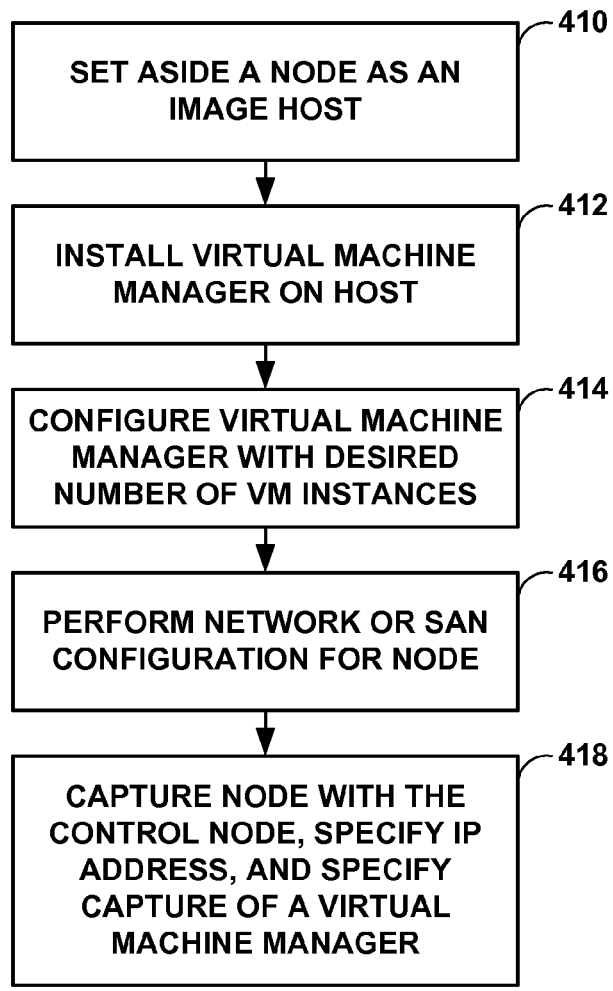
FIG. 25 is a flowchart illustrating an exemplary procedure for creating and capturing an image of a virtual machine manager for autonomic deployment within the distributed computing system.

FIG. 25 is a flowchart illustrating an exemplary procedure for creating and capturing a golden image for a particular virtual machine manager 402 (FIG. 24). Initially, administrator 20 sets aside a node (e.g., node 400) as an image host (410). Administrator 20 may then install a particular type of virtual machine manager 402 on node 400 (412). After administrator 20 installs virtual machine manager 402 on node 400, administrator 20 may configure the virtual machine manager to support a desired number of virtual machine instances (414). For example, administrator 20 could configure virtual machine manager 402 to support one or more virtual machines. Administrator 20 may then perform other network or Storage Area Network (SAN) configuration on virtual machine manager 402 (416). After administrator 20 performs all of the necessary configuration, administrator 20 instructs control node 12 to capture the image of virtual machine manager 402 with the configurations (418). Control node 12 may store the captured image as a golden image in application matrix 350 for use in subsequent autonomic deployment of image instances.

Figure 26:
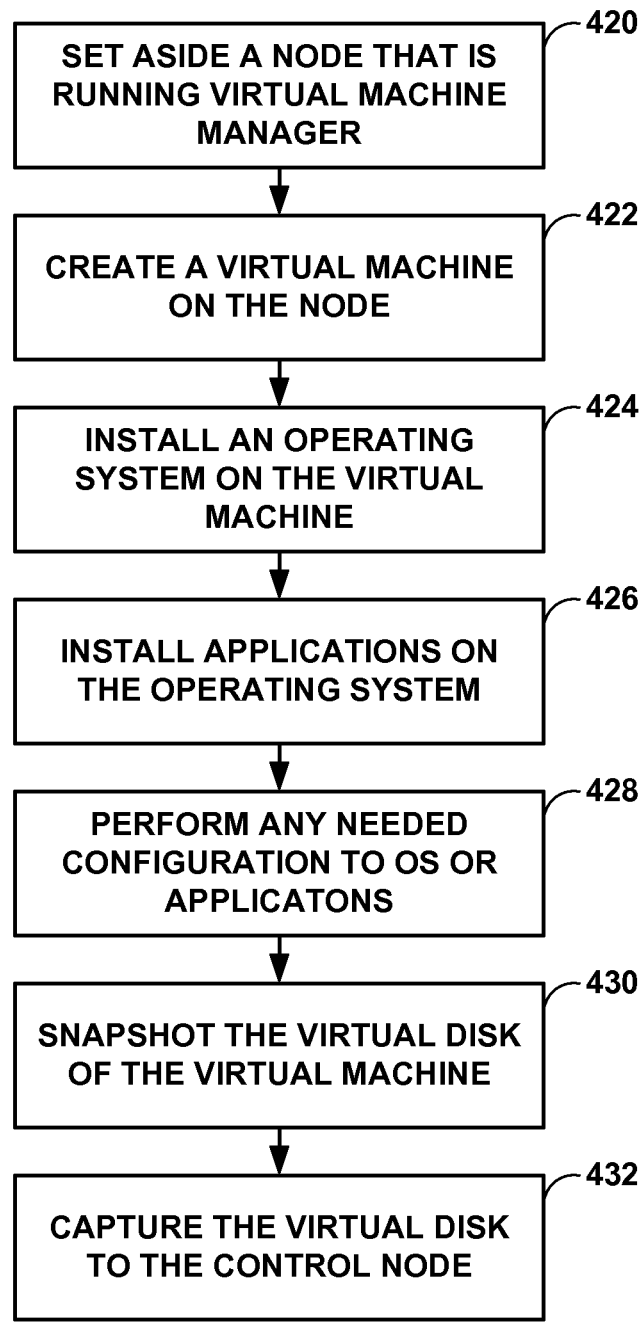
FIG. 26 is a flowchart illustrating an exemplary procedure for creating and capturing a virtual disk image file for autonomic deployment within the distributed computing system.

FIG. 26 is a flowchart illustrating an exemplary procedure for creating and capturing a virtual disk image file, i.e., a golden image of a guest operating system and applications for execution on a virtual machine. Initially, administrator 20 sets aside a node (e.g., node 400) that is running a virtual machine manager (e.g., virtual machine manager 402) (420). Administrator 20 may then configure the virtual machine manager to create a virtual machine (e.g., virtual machine 404) on node 400 (422). After creating the virtual machine, administrator 20 installs the particular operating system on virtual machine 404 (424). Administrator 20 may then install one or more applications on the operating system (426). After installation, administrator 20 may configure the operating system and applications as needed (428). In some embodiments, virtual machine manager 402 stores definition data for the particular virtual machine, operating system, and applications in a virtual disk image file. Once configuration is complete, administrator 20 takes a "snapshot" of the data in the virtual disk image file (430). Administrator 20 may then capture this "snapshot" to control node 12 as a golden image (432). Control node 12 may store the "snapshot" in application matrix 350 as a golden image for use in autonomic deployment of one or more image instances to virtual machines hosting the particular operating system and applications.

Figures 27A, 27B:
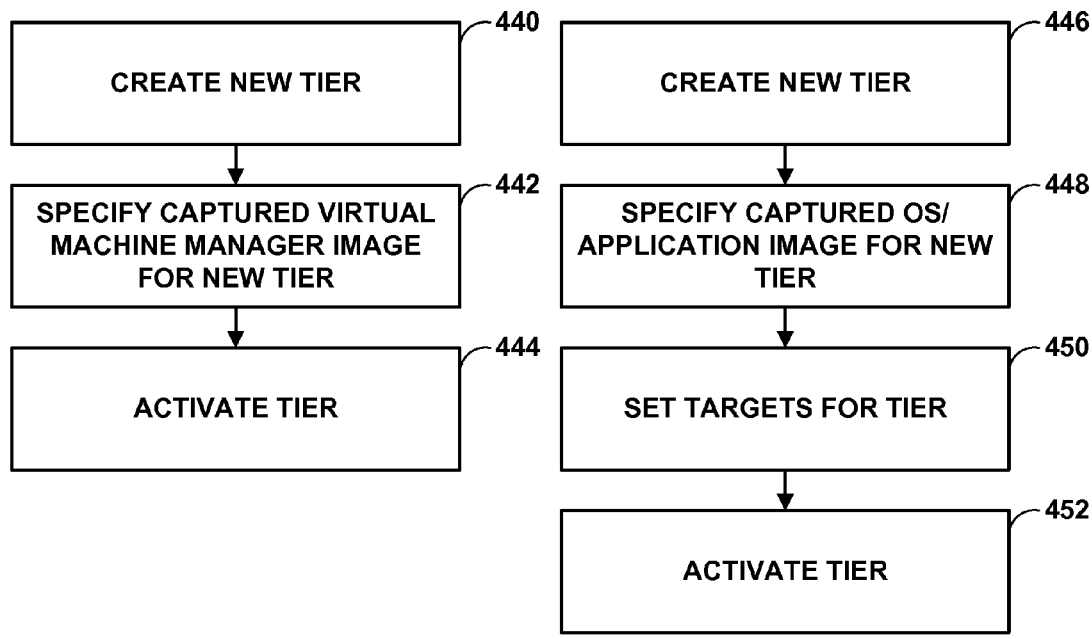
FIG. 27A is a flowchart illustrating an exemplary procedure for deploying a virtual machine manager to a node within the distributed computing system.
FIG. 27B is a flowchart illustrating an exemplary procedure for deploying an operating system and application image to a node that is executing a virtual machine manager within the distributed computing system.

FIG. 27A is a flowchart illustrating an exemplary procedure for autonomic deploying a virtual machine manager to a node. Initially, administrator 20 may instruct control node 12 to create a new tier (440). Subsequently, administrator 20 specifies one or more captured virtual machine manager image instances for assignment to the slots of the new tier (442). Administrator 20 may also specify whether the image instances of the tier run in persistent or non-persistent mode. Administrator 20 may then activate the new tier (444). After these physical nodes boot with the virtual machine manager image instance, each of the nodes creates a set of virtual machines as specified by the image instances. Control node 12 may then discover each of these virtual machines and place them in free pool 13 as if they were independent nodes. In this manner, each of the virtual machines appear to be physical nodes available for use as application nodes 14 when needed. However, control node 12 maintains tags or other metadata that distinguish between virtual machines and actual physical nodes. Finally, based on the current state and goals of distributed computing system 10, control node 12 may allocate one or more of the virtual machines to the slots within the tier, similar to the process by which nodes are deployed from the free pool 13 to a tier as needed.

FIG. 27B is a flowchart illustrating an exemplary procedure for deploying an operating system and application image instance to a node that is executing a virtual machine manager. To start the procedure, administrator 20 may instruct control node 12 to create a new tier, including defining the number of slots for the tier, or select an existing tier (446). Administrator 20 may then specify a captured operating system and application image for the tier (448). In addition, administrator 20 may set minimum, maximum, and target values for the image instances to be deployed to the slots new tier (450). Administrator 20 may then activate the tier (452). After administrator 20 activates the tier, based on the current state and goals of distributed computing system 10, control node 12 autonomically selects a virtual machine from free pool 13, associates the virtual machine with a slot in the tier, identifies the virtual disk image file (image instance) associated with the particular slot, copies the virtual disk image file to the local hard disk of the physical node on which the virtual node resides or the an associated SAN, and finally boots the virtual machine from the virtual disk image file.

Figure 28:
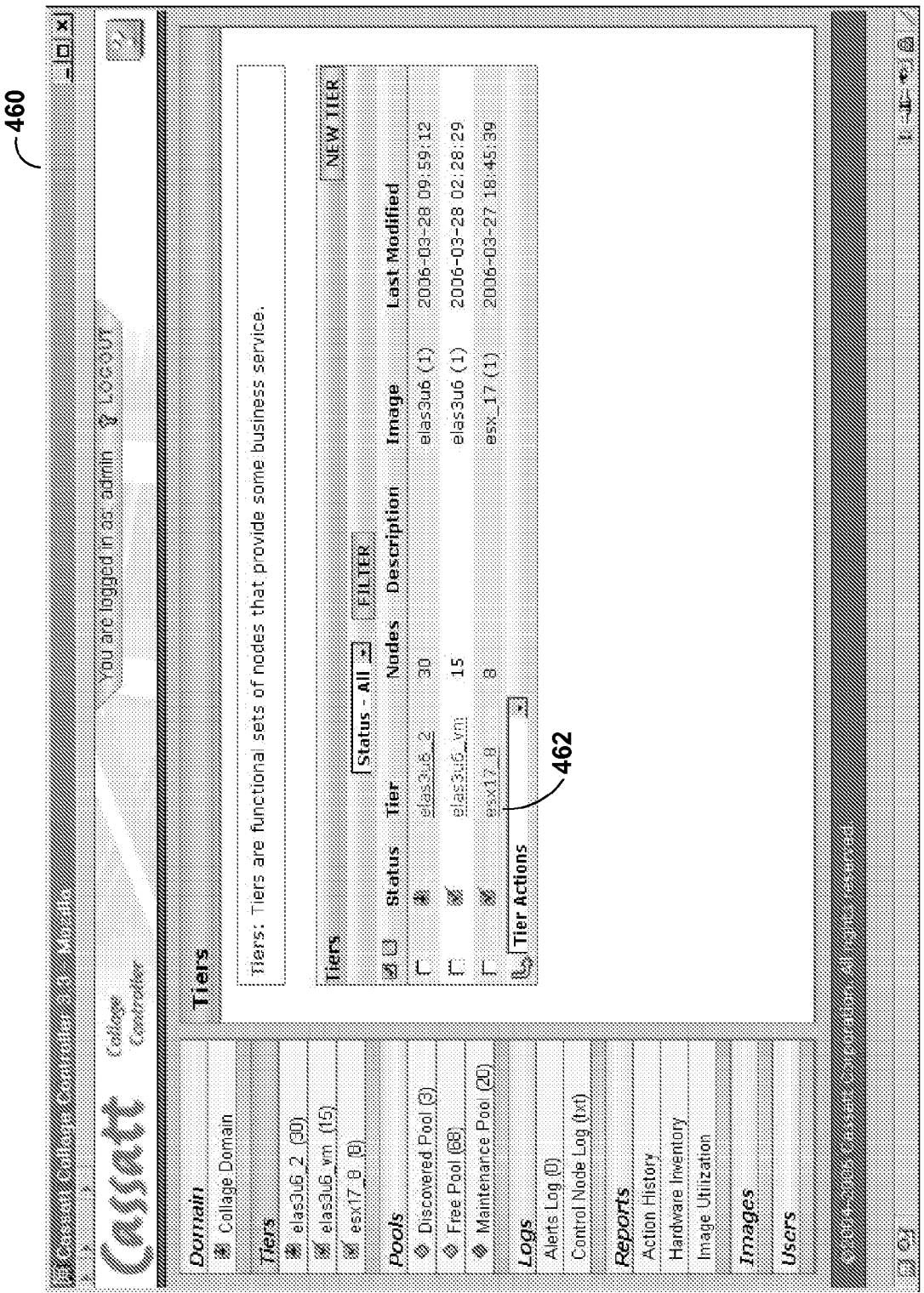
FIG. 28 is a screen image illustrating an exemplary tier control interface for the embodiment described in FIGS. 24 through 27.

FIG. 28 is a screen image illustrating an exemplary tier control interface 460 for the embodiment described in FIGS. 24 through 27 above. In this example, control interface 460 displays a set of three tiers "elas3u6__2", "elas3u6_vm", and "esx17__8". As illustrated in FIG. 28, tier "esx17__8", labeled 462, contains eight physical nodes. The image "esx__17" is operating on each node in tier 462. If the "esx__17" image is a virtual machine manager image that operates seventeen virtual machines, the eight nodes of tier 462 operate as 136 virtual machines.

Figure 29:
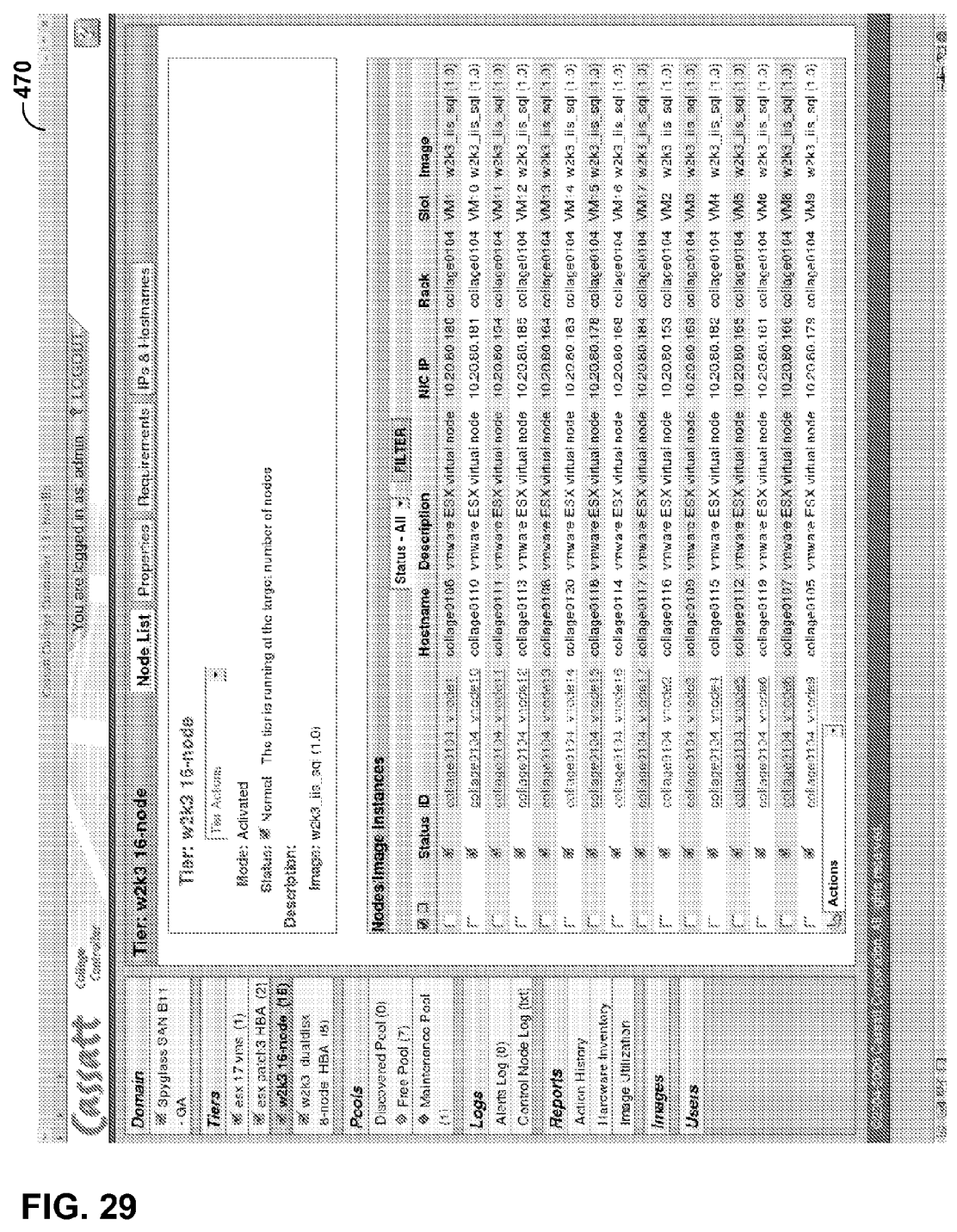

FIG. 29 is a screen image illustrating an exemplary node control interface 470 for the embodiment described in FIGS. 24 through 27 above. As illustrated in FIG. 29, a single physical node "collage0104" hosts seventeen virtual machines "collage0104_vnode1" through "collage0104_vnode17". Each of these virtual machines is loaded with the "w2k3_iis_sql (1.0)" image. For instance, the "w2k3_iis_sql (1.0)" image may be an image containing instances of Microsoft Windows 2003 Internet Information Server and Microsoft SQL Server.

Various embodiments of the invention have been described. These and other embodiments are within the scope of the following claims.

The invention claimed is:

1. A distributed computing system comprising:
 a software image repository comprising non-transitory, computer-readable media operable to store: (i) a plurality of image instances of a virtual machine manager that is executable on a plurality of application nodes, wherein when executed on the applications nodes, the image instances of the virtual machine manager provide a plurality of virtual machines, each of the plurality of virtual machine operable to provide an environment that emulates a computer platform, and (ii) a plurality of image instances of a plurality of software applications that are executable on the plurality of virtual machines; and
 a control node that comprises an automation infrastructure to provide autonomic deployment of the plurality of image instances of the virtual machine manager on the application nodes by causing the plurality of image instances of the virtual machine manager to be copied from the software image repository to the application nodes and to provide autonomic deployment of the plurality of image instances of the software applications on the virtual machines by causing the plurality of image instances of the software applications to be copied from the software image repository to the application nodes.

2. The distributed computing system of claim 1, wherein the image instances of the plurality of software applications comprise virtual disk image files.

3. The distributed computing system of claim 1, wherein a first image instance of the plurality of image instances of the plurality of software applications comprises an operating system.

4. The distributed computing system of claim 1, wherein a first image instance of the plurality of image instances of the plurality of software applications comprises a server application.

5. The distributed computing system of claim 1, wherein a first one of the virtual machines provides an environment that emulates an x86 platform.

6. The distributed computing system of claim 1, wherein the automation infrastructure captures a first image instance of the image instances of the virtual machine manager from a first application node of the plurality of application nodes.

7. The distributed computing system of claim 6, wherein the first application node executes the virtual machine manager.

8. The distributed computing system of claim 1, wherein the control node maintains the plurality of image instances of the virtual machine manager and the plurality of image instances of the plurality of software applications as persistent or non-persistent based on a configuration.

9. The distributed computing system of claim 1, wherein the control node further comprises one or more rule engines that provide autonomic deployment of the software applications to the virtual machines in accordance with a set of one or more rules.

10. The distributed computing system of claim 9, wherein the one or more rule engines are forward-chaining rule engines.

11. The distributed computing system of claim 9, wherein the automation infrastructure automatically updates the one or more rules engines to autonomously control the deployment of the software applications to the application nodes in accordance with a current state of an application matrix.

12. The distributed computing system of claim 1, wherein the control node further comprises an application matrix that includes parameters for controlling the deployment, undeployment, and execution of the software applications to the virtual machines within the distributed computing system.

13. The distributed computing system of claim 12, further comprising an application governor that accesses the application matrix to communicate instructions from the automation infrastructure to the software applications.

14. The distributed computing system of claim 9, wherein the automation infrastructure automatically updates the one or more rules engines to monitor the execution of the software applications when deployed to the application nodes in accordance with a current state of the application matrix.

15. The distributed computing system of claim 1, wherein the automation subsystem includes a rule compiler that compiles rules into one or more discrimination networks.

16. The distributed computing system of claim 1, wherein the control node further comprises:
a monitoring subsystem that collects status data from the application nodes and communicates the status data to the automation subsystem, wherein the status data represents an actual state for the application nodes; and
a business logic tier that provides expected state data to the automation subsystem, wherein the expected state data represents an expected state for the application nodes,
wherein one or more rule engines analyze the status data from the monitoring subsystem and apply a set of rules to produce action requests to the business logic tier to control the application nodes to reduce any difference between the actual state and the expected state.

17. The distributed computing system of claim 1, wherein the application nodes are organized into tiers, and wherein status data is collected based on the tiers.

18. The distributed computing system of claim 1, further comprising:
a database storing data that defines a model for a hierarchical organization of the distributed computing system, wherein the model specifies a fabric having one or more domains, and wherein each domain has at least one tier that includes at least one of the application nodes,
wherein one or more rule engines automatically produce action requests to control the deployment of the software applications in accordance with the hierarchical organization of the distributed computing system defined by the model.

19. A method comprising:
storing a plurality of image instances of a virtual machine manager that is executable on a plurality of application nodes in a distributed computing system, wherein the image instances of the virtual machine manager provide a plurality of virtual machines, each virtual machine operable to provide an environment that emulates a computer platform;
storing a plurality of image instances of a plurality of software applications that are executable on the plurality of virtual machines;
executing a rules engine to perform operations to autonomically deploy the image instances of the virtual machine manager on the application nodes by causing the image instances of the virtual machine manager to be copied to the application nodes; and
executing the rules engine to perform operations to autonomically deploy the image instances of the software applications on the virtual machines by causing the image instances of the software applications to be copied to the application nodes.

20. The method of claim 19, wherein storing the image instances of the plurality of software applications comprises storing virtual disk image files.

21. The method of claim 19, wherein a first image instance of the plurality of image instances of the plurality of software applications comprises an operating system.

22. The method of claim 19,
further comprising generating an application matrix that specifies data for controlling the deployment of the software applications within the distributed computing system; and
wherein performing operations to provide autonomic control comprises providing autonomic control over the deployment, undeployment, and execution of the software applications on the virtual machines within the distributed computing system in accordance with parameters of the application matrix.

23. The method of claim 19, wherein performing operations to autonomically deploy the image instances of the software applications on the virtual machines comprises:
receiving status data for the distributed computing system, wherein the status data represents an actual state of the application nodes;
processing the status data with rules in a set of rule engines to determine operations for reducing any difference between an expected state and the actual state of the application nodes; and
performing the operations to provide autonomic control over the deployment of the software applications on the virtual machines within the distributed computing system in accordance with the rules.

24. The method of claim 19, further comprising accessing parameters of an application matrix and determining one or more rules for use in autonomically controlling the deployment of the software applications on the virtual machines.

25. The method of claim 24, further comprising processing the one or more rules with a plurality of forward-chaining rule engines that compile the one or more rules into one or more discrimination networks.

26. A non-transitory, computer-readable medium comprising instructions stored thereon, that when executed by a programmable processor:
store a plurality of image instances of a virtual machine manager that is executable on a plurality of application nodes in a distributed computing system, wherein the image instances of the virtual machine manager provide a plurality of virtual machines, each virtual machine operable to provide an environment that emulates a computer platform;

store a plurality of image instances of a plurality of software applications that are executable on the plurality of virtual machines;

perform operations to autonomically deploy the image instances of the virtual machine manager on the application nodes by causing the image instances of the virtual machine manager to be copied to the application nodes; and perform operations to autonomically deploy the image instances of the software applications on the virtual machines by causing the image instances of the software applications to be copied to the application nodes.

* * * * *

(12) INTER PARTES REVIEW CERTIFICATE (3626th)
United States Patent
Sundar et al.

(10) Number: US 8,572,138 K1
(45) Certificate Issued: Jun. 28, 2024

(54) DISTRIBUTED COMPUTING SYSTEM HAVING AUTONOMIC DEPLOYMENT OF VIRTUAL MACHINE DISK IMAGES

(75) Inventors: Jagane Sundar; Sanjay Radia; David A. Henseler

(73) Assignee: AVAGO TECHNOLOGIES INTERNATIONAL SALES PTE. LIMITED

Trial Numbers:

IPR2020-01582 filed Sep. 10, 2020
IPR2021-00542 filed Feb. 22, 2021

Inter Partes Review Certificate for:

Patent No.: 8,572,138
Issued: Oct. 29, 2013
Appl. No.: 11/694,483
Filed: Mar. 30, 2007

The results of IPR2020-01582; IPR2021-00542 are reflected in this inter partes review certificate under 35 U.S.C. 318(b).

INTER PARTES REVIEW CERTIFICATE
U.S. Patent 8,572,138 K1
Trial No. IPR2020-01582
Certificate Issued Jun. 28, 2024

AS A RESULT OF THE INTER PARTES REVIEW PROCEEDING, IT HAS BEEN DETERMINED THAT:

Claims 1-5, 9-12, 14, 17, 19-22, 24 and 26 are found patentable.

\* \* \* \* \*